US012615115B2

(12) United States Patent
Ryu et al.

(10) Patent No.: US 12,615,115 B2
(45) Date of Patent: Apr. 28, 2026

(54) MULTI-BURST A-TRS FOR LOOP OPERATION ON SSB-LESS SECONDARY CELL IN INTER-BAND CARRIER AGGREGATION

(71) Applicant: QUALCOMM Incorporated, San Diego, CA (US)

(72) Inventors: Jae Ho Ryu, San Diego, CA (US); Jianghong Luo, Skillman, NJ (US); Konstantinos Dimou, New York City, NY (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 17/937,269

(22) Filed: Sep. 30, 2022

(65) Prior Publication Data
US 2024/0113832 A1     Apr. 4, 2024

(51) Int. Cl.
H04L 5/00 (2006.01)
H04W 72/23 (2023.01)
(52) U.S. Cl.
CPC ........... H04L 5/0051 (2013.01); H04W 72/23 (2023.01)
(58) Field of Classification Search
CPC ..... H04L 5/0051; H04L 5/001; H04L 5/0048; H04L 5/0053; H04L 5/005; H04L 5/0098; H04L 5/0007; H04W 72/23; H04W 56/001; H04W 80/02
See application file for complete search history.

(56) References Cited

U.S. PATENT DOCUMENTS

| | | | |
|---|---|---|---|
| 2019/0058517 A1 | 2/2019 | Kang et al. | |
| 2021/0297169 A1* | 9/2021 | Yoon | H04J 11/0069 |
| 2022/0225251 A1* | 7/2022 | Yang | H04L 5/0053 |
| 2023/0039325 A1* | 2/2023 | Harada | H04L 5/0048 |

OTHER PUBLICATIONS

International Search Report and Written Opinion—PCT/US2023/073123—ISA/EPO—Feb. 2, 2024.
Moderator (Huawei): "Summary#1 of Efficient SCell Activation/De-activation Mechanism of NR CA", 3GPP TSG RAN WG1 #103-e, R1-2009569, 3rd Generation Partnership Project, Mobile Competence Centre, 650, Route Des Lucioles, F-06921 Sophia-Antipolis Cedex, France, vol. RAN WG1, No. E-Meeting, Oct. 26, 2020-Nov. 13, 2020, Nov. 5, 2020, 27 Pages, XP052351480, Section 2.1, Subsection 3.2.1.3.

* cited by examiner

*Primary Examiner* — Dady Chery
(74) *Attorney, Agent, or Firm* — ArentFox Schiff, LLP

(57) ABSTRACT

Aspects of the present disclosure allow a UE to request, in an anchor carrier on one frequency band, a base station to configure and transmit A-TRS in an SSB-less secondary carrier on a different frequency band. The UE transmits, in a first cell served by the anchor carrier, a request for A-TRS. Based on the request, the UE receives, in a second cell lacking SSB transmissions served by the secondary carrier, the A-TRS based on the request. The base station may also control transmission of the A-TRS in the SSB-less secondary cell based on a timer derived from the request. Using the A-TRS, the UE may apply AGC and time/frequency tracking loop operations prior to receiving a PDSCH in the SSB-less secondary cell, thereby improving reception performance of downlink data transmissions in the secondary carrier. Thus, network energy savings provided by SSB-less secondary carriers may be obtained in inter-band CA.

27 Claims, 13 Drawing Sheets

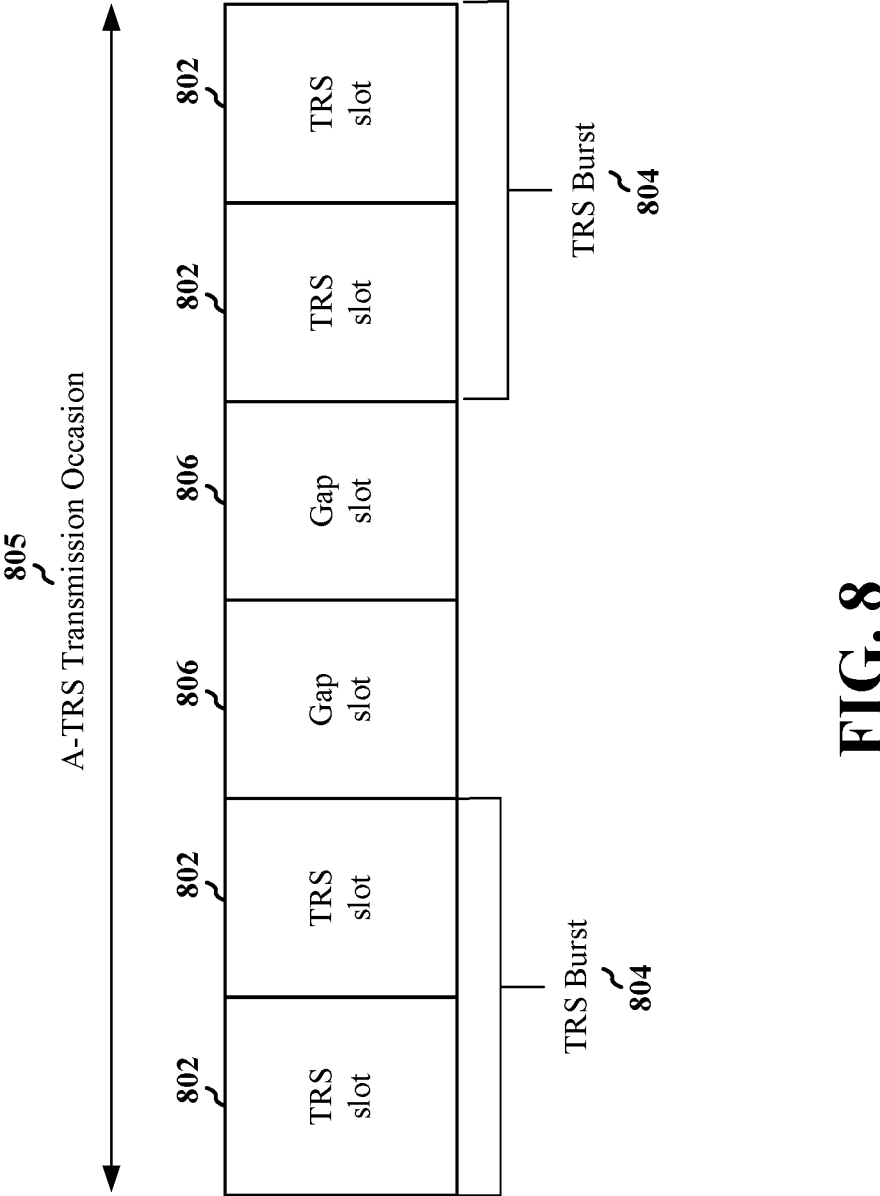
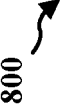
FIG. 8

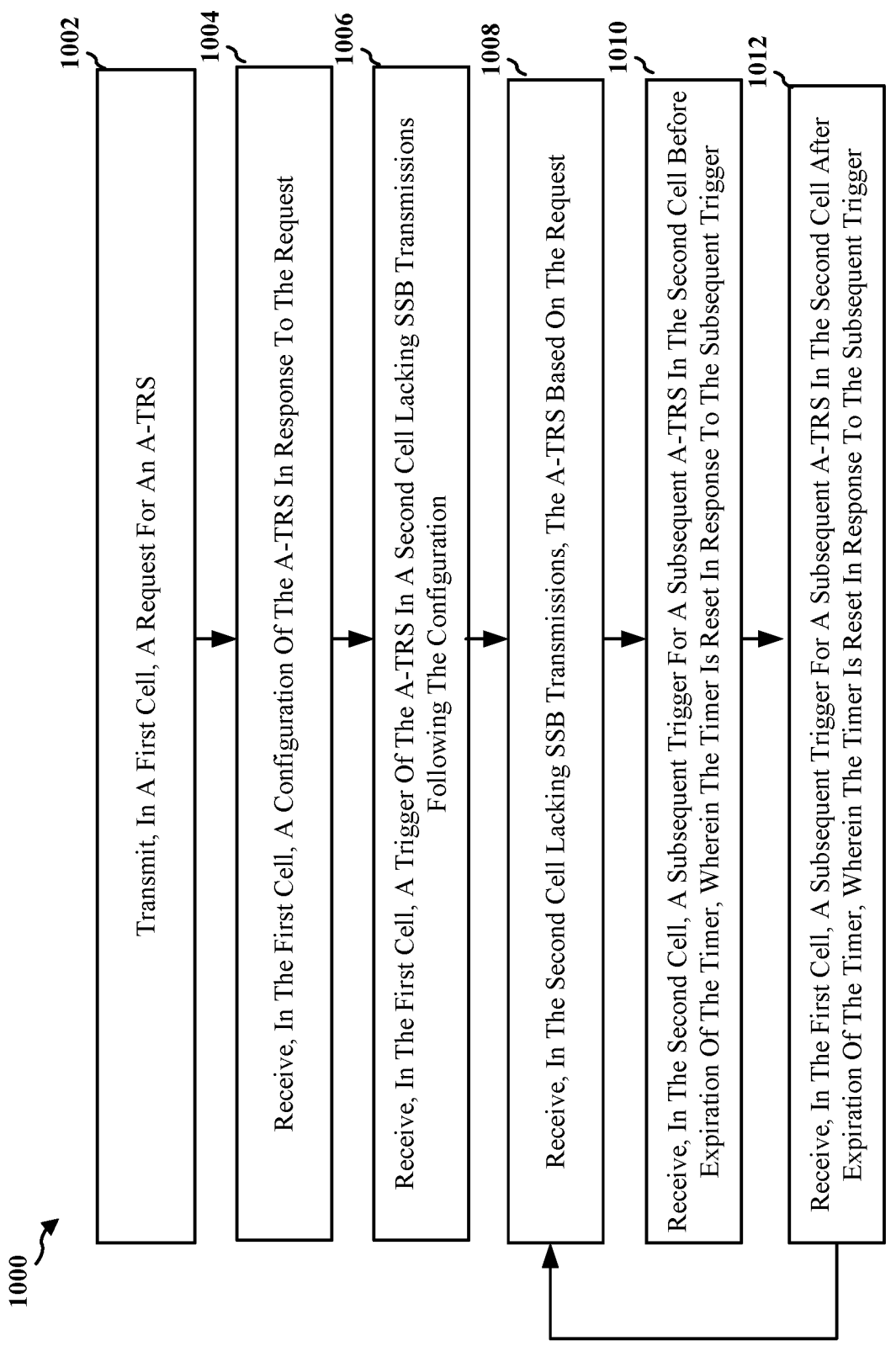

1000

1002 Transmit, In A First Cell, A Request For An A-TRS

1004 Receive, In The First Cell, A Configuration Of The A-TRS In Response To The Request 1006 Receive, In The First Cell, A Trigger Of The A-TRS In A Second Cell Lacking SSB Transmissions Following The Configuration 1008 Receive, In The Second Cell Lacking SSB Transmissions, The A-TRS Based On The Request 1010 Receive, In The Second Cell, A Subsequent Trigger For A Subsequent A-TRS In The Second Cell Before Expiration Of The Timer, Wherein The Timer Is Reset In Response To The Subsequent Trigger 1012 Receive, In The First Cell, A Subsequent Trigger For A Subsequent A-TRS In The Second Cell After Expiration Of The Timer, Wherein The Timer Is Reset In Response To The Subsequent Trigger

FIG. 10

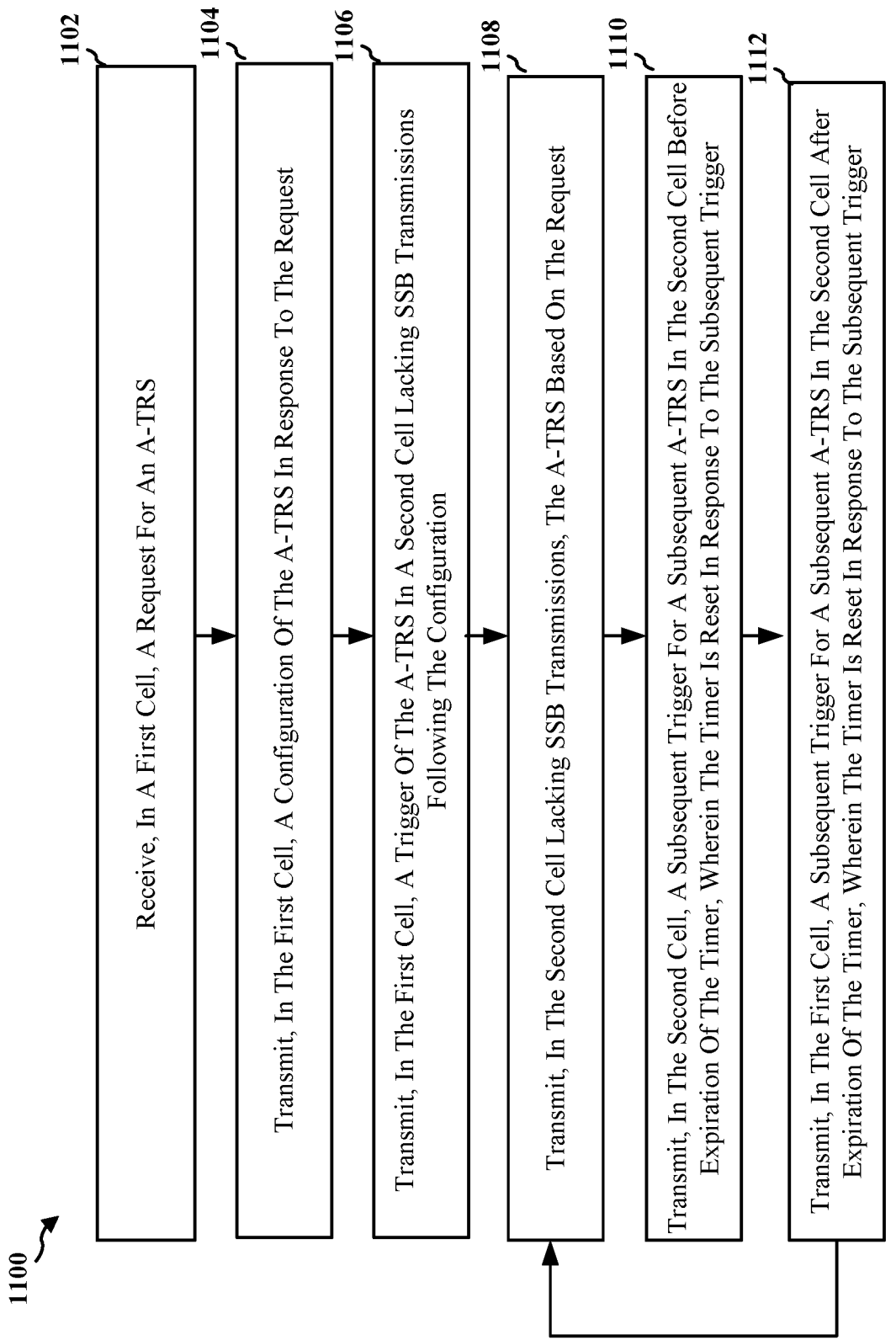

1100

1102 Receive, In A First Cell, A Request For An A-TRS

1104 Transmit, In The First Cell, A Configuration Of The A-TRS In Response To The Request 1106 Transmit, In The First Cell, A Trigger Of The A-TRS In A Second Cell Lacking SSB Transmissions Following The Configuration 1108 Transmit, In The Second Cell Lacking SSB Transmissions, The A-TRS Based On The Request 1110 Transmit, In The Second Cell, A Subsequent Trigger For A Subsequent A-TRS In The Second Cell Before Expiration Of The Timer, Wherein The Timer Is Reset In Response To The Subsequent Trigger 1112 Transmit, In The First Cell, A Subsequent Trigger For A Subsequent A-TRS In The Second Cell After Expiration Of The Timer, Wherein The Timer Is Reset In Response To The Subsequent Trigger

FIG. 11

MULTI-BURST A-TRS FOR LOOP OPERATION ON SSB-LESS SECONDARY CELL IN INTER-BAND CARRIER AGGREGATION

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus includes a processor, memory coupled with the processor, and instructions stored in the memory and operable, when executed by the processor, to cause the apparatus to: transmit, in a first cell, a request for an aperiodic tracking reference signal (A-TRS); and receive, in a second cell lacking synchronization signal block (SSB) transmissions, the A-TRS based on the request.

In an aspect of the disclosure, a method, a computer-readable medium, and an apparatus are provided. The apparatus may be a base station. The apparatus includes a processor, memory coupled with the processor, and instructions stored in the memory and operable, when executed by the processor, to cause the apparatus to: receive, in a first cell, a request for an A-TRS; and transmit, in a second cell lacking SSB transmissions, the A-TRS based on the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating an example of a multi-burst A-TRS configuration based on parameters the UE indicates to the base station in an A-TRS request.

FIG. 10 is a flowchart of a method of wireless communication at a UE.

FIG. 11 is a flowchart of a method of wireless communication at a base station.

DETAILED DESCRIPTION

Figure 1:
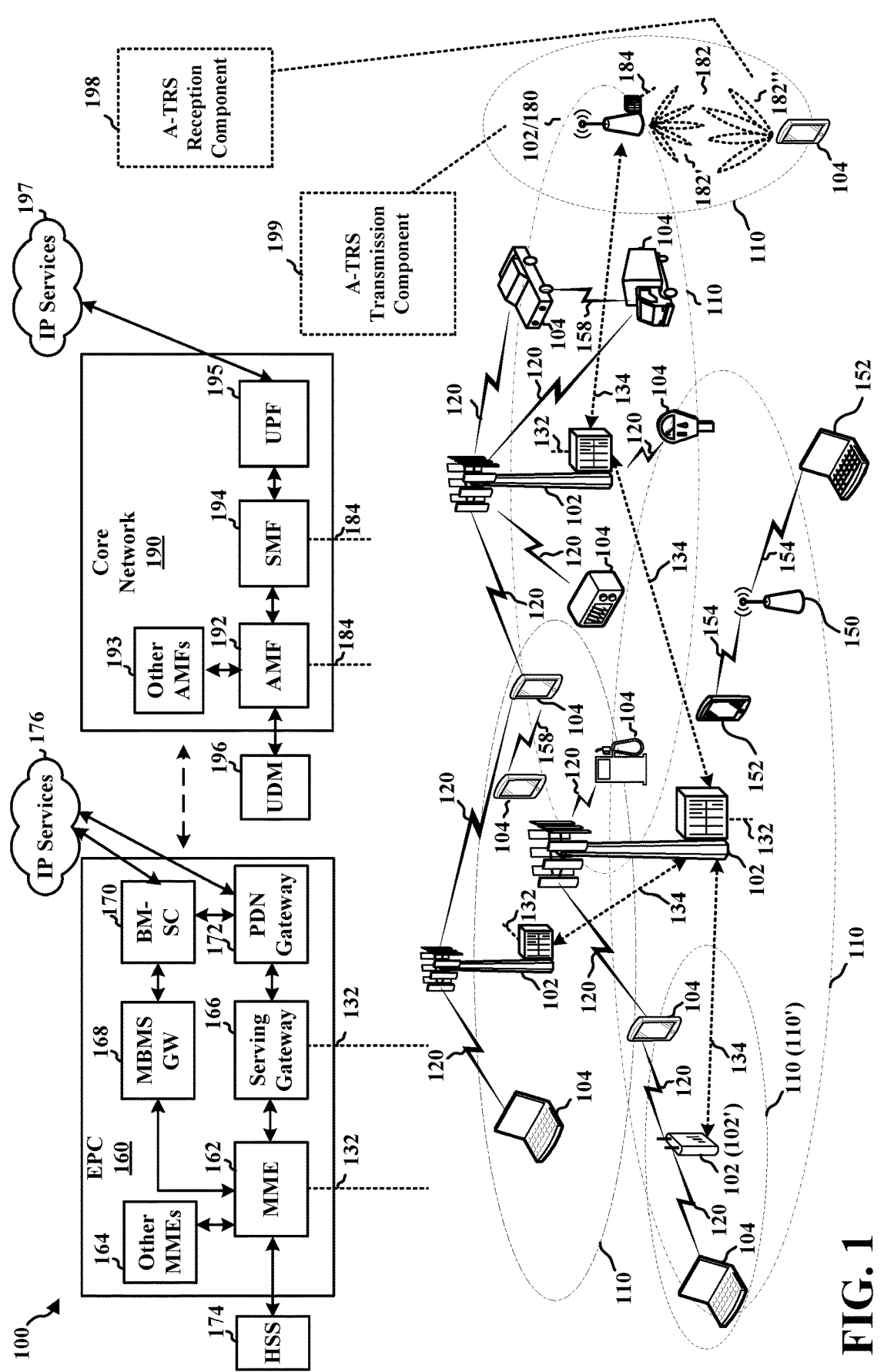
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

To assist a UE in synchronizing with a base station during initial access, the base station may periodically transmit synchronization signal blocks (SSBs) to the UE. However, this periodic transmission of SSBs may inefficiently consume energy at the base station. For example, a base station intending to serve a UE in multiple cells through carrier aggregation (CA), including an anchor cell (e.g., a PCell or primary component carrier) and a secondary cell (e.g., an SCell or secondary component carrier), typically transmits SSBs periodically in both component carriers, even though a UE or base station may not intend to transmit or receive data in the secondary cell. Therefore, to save network energy in multi-carrier scenarios, a base station may refrain from transmitting SSBs (as well as other common channels and signals) in secondary cells (or other component carriers). These secondary cells lacking SSBs are referred to throughout this disclosure as SSB-less secondary cells (or component carriers).

However, when a base station implements SSB-less secondary cells in inter-band CA for network energy savings, the lack of SSB transmissions in such secondary cells may impact the reception performance of a UE intending to receive data in that secondary cell. For example, a receiver of a UE typically applies an automated gain control (AGC) loop and a time and/or frequency tracking loop (e.g., a phase locked loop and/or a frequency locked loop) in order to respectively align or synchronize a voltage and waveform of a received signal. These loops may be implemented in the receiver for example, using hardware components such as detectors, filters, oscillators, and the like. Using these loops (e.g., by performing the aforementioned loop operations), the UE may receive SSBs in a cell, as well as perform radio resource management (RRM) measurements of the SSBs for cell selection/reselection, SCell activation, beam management, or other functions. The UE may then successfully receive subsequent downlink signals in PDCCH or PDSCH of the cell as a result of performing loop operations on these SSBs in that cell. Yet, if such cell lacks such SSBs (the cell is an SSB-less secondary cell), these loop operations may not be performed in the secondary cell before the PDCCH or PDSCH is received, and thus the likelihood of successful reception of the downlink signals may be reduced.

The aforementioned impact of SSB-less secondary cells to UE reception performance is particular to inter-band CA deployments. In contrast, in intra-band CA, the impact is negligible, since the results of the loop operations for AGC and time/frequency tracking that the UE already applies for the anchor carrier (e.g., the power alignment or waveform synchronization) may be carried over to the secondary carrier. For instance, in intra-band CA, the propagation characteristics (e.g., the power, frequency, and timing) of downlink signals in the anchor carrier may be the same (or almost the same) as those in the secondary carrier, and thus the UE may carry over the results of the loop operations performed on SSBs received in the anchor cell to PDCCH and PDSCH signals received in the SSB-less secondary cell. However, in inter-band CA, the propagation characteristics of the anchor carrier and the SSB-less secondary carrier may be different with respect to path loss, multipath fading, Doppler effects, and therefore the UE may not simply carry over the results of the loop operations performed in the anchor cell to the secondary cell in inter-band CA. Instead, the UE may be required to perform separate loop operations in the secondary cell to achieve power alignment or waveform synchronization prior to receiving PDCCH or PDSCH in that cell. Yet, since the secondary cell does not include SSB transmissions (the cell is a SSB-less secondary cell), the UE cannot rely on SSBs in the secondary cell to perform these loop operations, and thus the loop operations may end up not being performed.

Thus, in inter-band CA, a base station may not be able to use SSB-less secondary cells for network energy savings unless a different reference signal can be transmitted in that secondary cell for the UE to apply in loop operations. Accordingly for this purpose, aspects of the present disclosure provide that if the base station intends to schedule a PDSCH in an SSB-less secondary cell, the base station may transmit a tracking reference signal (TRS) (e.g., a CSI-RS for time/frequency tracking) in the SSB-less secondary cell for the UE to apply in its SCell loop operations prior to transmitting the PDSCH. For purposes of network energy savings using an SSB-less secondary cell, the base station may specifically utilize aperiodic TRS (A-TRS) to minimize the number of transmissions of TRS and thus power consumption. For instance, the base station may transmit multiple bursts of A-TRS (also referred to as a multi-burst A-TRS) in the SSB-less secondary cell for the UE to apply in its AGC loop and time/frequency tracking loop prior to receiving a PDCCH or PDSCH in that secondary cell.

One example where the base station may apply such A-TRS is in fast SCell activation. In fast SCell activation, a base station may trigger one or two bursts of A-TRS (or temporary RS), with each burst including two slots and four CSI-RS resources (two CSI-RS resources per slot), for the UE to apply for AGC or time/frequency tracking in activated SCells. Accordingly, a base station may perform fast SCell activation of SSB-less secondary cells using an A-TRS which the UE may apply in its SCell loop operations prior to receiving a PDSCH in the SSB-less secondary cell. However, in such scenarios where the UE receives A-TRS in an SSB-less carrier, it would be helpful to specify a preferred A-TRS configuration for such A-TRS.

Accordingly, aspects of the present disclosure allow a UE to request (e.g., via UE assistance information) a base station to provide an A-TRS configuration indicating various parameters for the A-TRS which the base station is to transmit in the SSB-less secondary cell, and allow a base station to control transmission of the A-TRS in the SSB-less secondary cell based on a timer derived from the request. Moreover, aspects of the present disclosure allow a base station to trigger A-TRS transmissions in the SSB-less secondary cell via cross-carrier scheduling (e.g., using a DCI in the anchor cell which triggers A-TRS in the SSB-less secondary cell) before initiation of the timer or after expiration of the timer derived from the request. Additionally, aspects of the present disclosure allow a base station to trigger A-TRS transmissions in the SSB-less secondary cell via self-scheduling (e.g., using a DCI in the SSB-less secondary cell which triggers A-TRS and schedules PDSCH in the SSB-less secondary cell) before expiration of the timer derived from the request. As a result, network energy savings provided by SSB-less secondary cells may be accommodated in inter-band CA.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include an A-TRS reception component 198 configured to transmit, in a first cell, a request for an aperiodic tracking reference signal (A-TRS); and receive, in a second cell lacking synchronization signal block (SSB) transmissions, the A-TRS based on the request.

Referring again to FIG. 1, in certain aspects, the base station 102/180 may include an A-TRS transmission component 199 configured to receive, in a first cell, a request for an A-TRS; and transmit, in a second cell lacking SSB transmissions, the A-TRS based on the request.

Figures 2A, 2B, 2C, 2D:
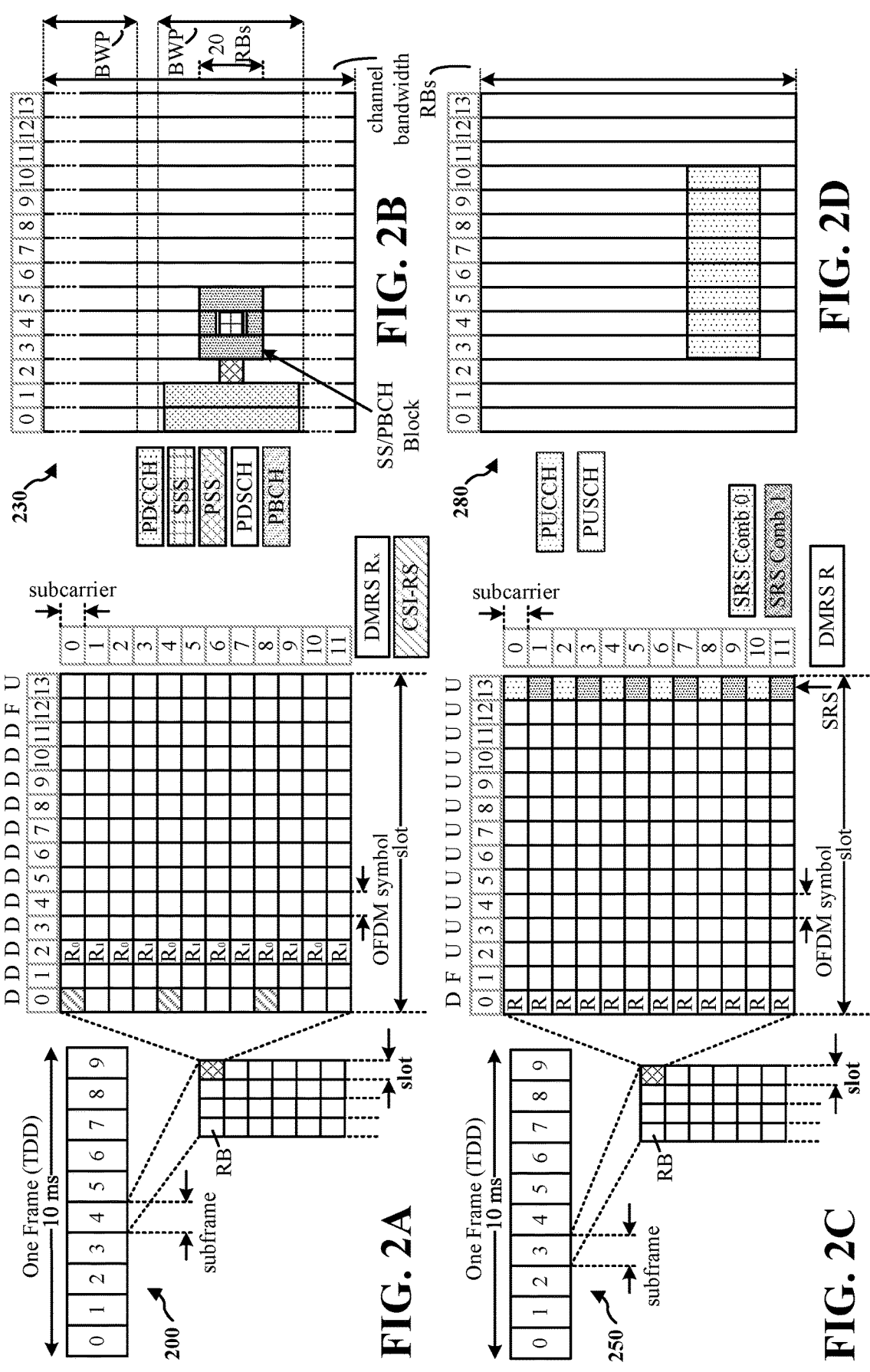
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
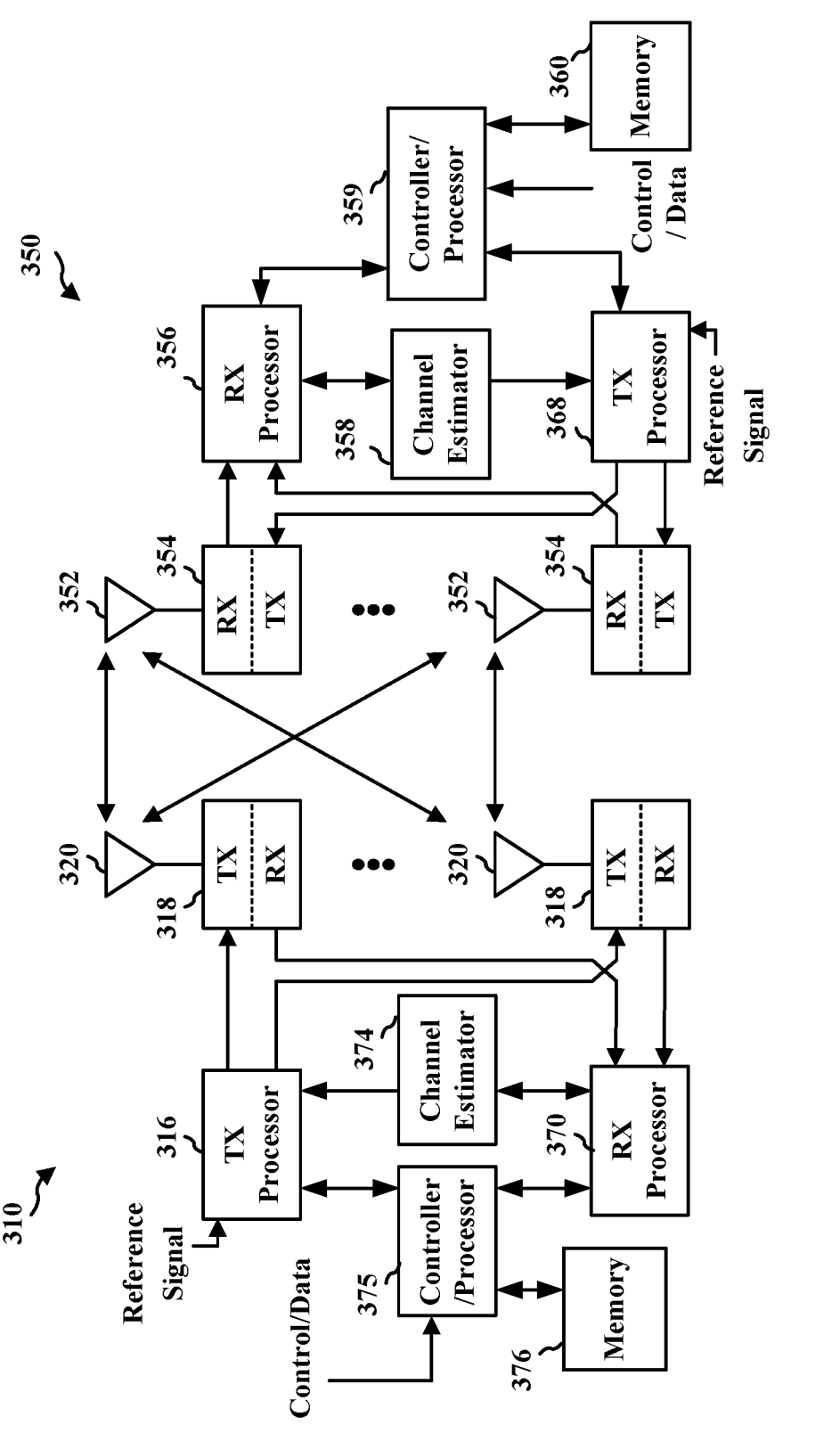
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with A-TRS reception component 198 of FIG. 1.

At least one of the TX processor 316, the RX processor 370, and the controller/processor 375 may be configured to perform aspects in connection with A-TRS transmission component 199 of FIG. 1.

In carrier aggregation (CA), two or more component carriers (CCs) may be aggregated in order to support wider transmission bandwidths. Aggregation may be arranged using contiguous CCs within the same operating frequency band (e.g. intra-band contiguous CA), using non-contiguous CCs within the same operating frequency band but with gaps in between (e.g. intra-band non-contiguous CA), and using CCs within different operating frequency bands (e.g. inter-band CA). In DL carrier aggregation, a base station transmits downlink data in multiple CCs to a UE, while in UL carrier aggregation, a UE transmits uplink data in multiple CCs to the base station.

To assist a UE in synchronizing with a base station during initial access, the base station may periodically transmit SSBs to the UE. However, this periodic transmission of SSBs may inefficiently consume energy at the base station. For example, a base station intending to serve a UE in multiple cells through CA, including an anchor cell (e.g., a PCell or primary component carrier) and a secondary cell (e.g., an SCell or secondary component carrier), typically transmits SSBs periodically in both CCs, even though a UE or base station may not intend to transmit or receive data in the secondary cell. Therefore, to save network energy in multi-carrier scenarios, a base station may refrain from transmitting SSBs (as well as other common channels and signals) in secondary cells (or other CCs). These secondary cells lacking SSBs are referred to throughout this disclosure as SSB-less secondary cells (or CCs).

Figure 4:
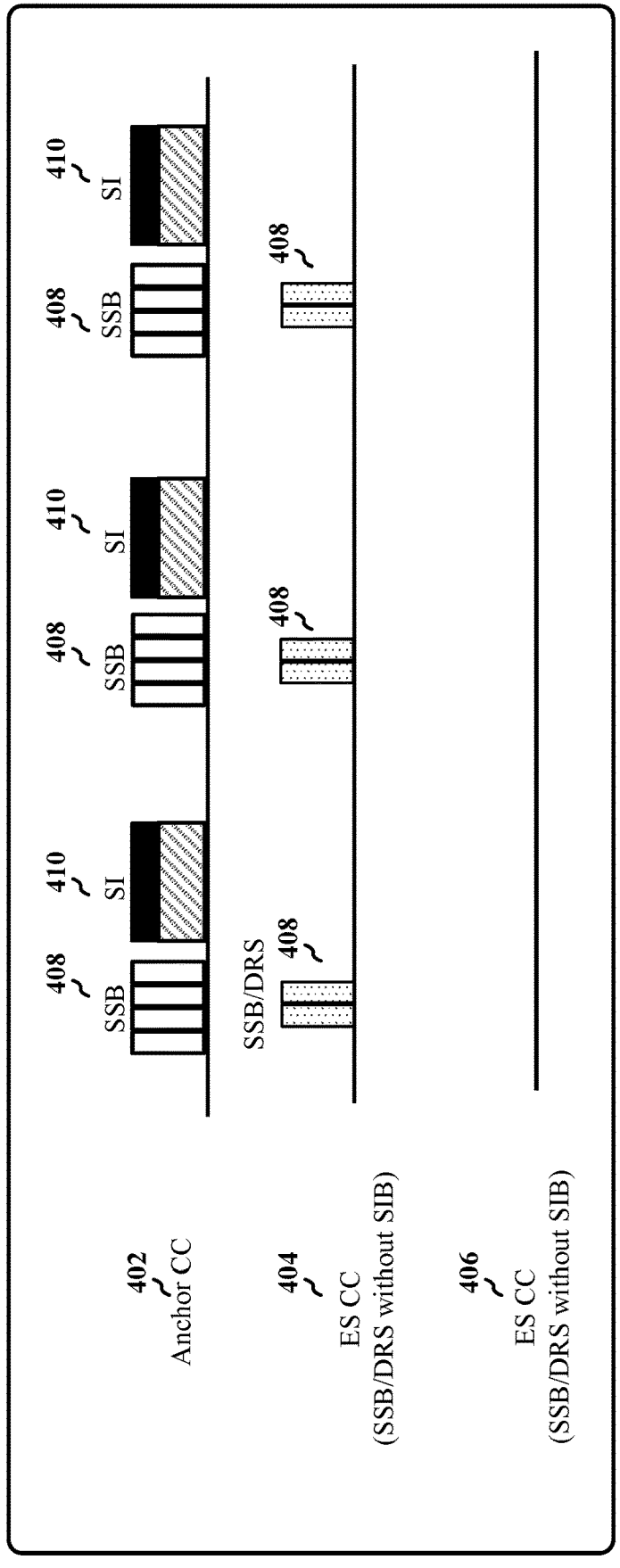
FIG. 4 is a diagram illustrating an example of an anchor carrier, a secondary carrier, and an SSB-less secondary carrier.

FIG. 4 illustrates an example 400 of an anchor carrier 402 (e.g., a PCell), a secondary carrier 404, and an SSB-less secondary carrier 406. To perform downlink and uplink synchronization with a base station, a UE may periodically receive an SSB 408 (or a discovery reference signal (DRS)) and system information (SI) 410 (e.g., an SIB including various configurations for network operation) in the anchor carrier 402. The base station may periodically transmit SSBs 408 and SI 410 in the anchor carrier 402 even at times when the UE does not intend to receive or transmit data to the base station. However, in the secondary carriers 404, 406, the base station may perform network energy savings by eliminating the transmission of one or more of these signals. Thus, FIG. 4 refers to these secondary carriers as energy saving (ES) component carriers (CCs). For instance, to save energy in secondary carrier 404 when no downlink data is pending for a UE, the base station may refrain from periodically transmitting SI 410 since this information is already being transmitted in anchor carrier 402, although the base station may continue to transmit SSBs 408 (or DRS) in secondary carrier 404. Moreover, to save additional energy in SSB-less secondary carrier 406 when no downlink data is pending for a UE, the base station may further refrain from periodically transmitting SSBs 408 (as well as SI 410), since again this information is already being transmitted in anchor carrier 402.

However, when a base station implements SSB-less secondary cells in inter-band CA for network energy savings, the lack of SSB transmissions in such secondary cells may impact the reception performance of a UE intending to receive data in that secondary cell. For example, a receiver of a UE typically applies an automated gain control (AGC) loop and a time and/or frequency tracking loop (e.g., a phase locked loop and/or a frequency locked loop) in order to respectively align or synchronize a voltage and waveform of a received signal. These loops may be implemented in the receiver for example, using hardware components such as detectors, filters, oscillators, and the like. Using these loops (e.g., by performing the aforementioned loop operations), the UE may receive SSBs in a cell, as well as perform radio resource management (RRM) measurements of the SSBs for cell selection/reselection, SCell activation, beam management, or other functions. The UE may then successfully receive subsequent downlink signals in PDCCH or PDSCH of the cell as a result of performing loop operations on these SSBs in that cell. Yet, if such cell lacks such SSBs (the cell is an SSB-less secondary cell), these loop operations may not be performed in the secondary cell before the PDCCH or PDSCH is received, and thus the likelihood of successful reception of the downlink signals may be reduced.

The aforementioned impact of SSB-less secondary cells to UE reception performance is particular to inter-band CA deployments. In contrast, in intra-band CA, the impact is negligible, since the results of the loop operations for AGC and time/frequency tracking that the UE already applies for the anchor carrier (e.g., the power alignment or waveform synchronization) may be carried over to the secondary carrier. For instance, in intra-band CA, the anchor carrier and secondary carrier are generally located in the same frequency band, and in many cases may be adjacent carriers for the same base station (intra-band contiguous CA). These cells may also be collocated. As a result, the propagation characteristics (e.g., the power, frequency, and timing) of downlink signals in the anchor carrier may be the same (or almost the same) as those in the secondary carrier, and thus the UE may carry over the results of the loop operations performed on SSBs received in the anchor cell to PDCCH and PDSCH signals received in the SSB-less secondary cell. However, in inter-band CA, the anchor carrier and the SSB-less secondary carrier are in different frequency bands (e.g., a 2 GHz band and a 3 GHz band respectively), and thus their propagation characteristics may be different with respect to path loss, multipath fading, Doppler effects, and the like, even if the anchor cell and SCell are collocated. Thus, the UE may not simply carry over the results of the loop operations performed in the anchor cell to the secondary cell in inter-band CA; instead, the UE may be required to perform separate loop operations in the secondary cell to achieve power alignment or waveform synchronization prior to receiving PDCCH or PDSCH in that cell. Yet, since the secondary cell does not include SSB transmissions (the cell is a SSB-less secondary cell), the UE cannot rely on SSBs in the secondary cell to perform these loop operations, and thus the loop operations may end up not being performed before the PDCCH or PDSCH is transmitted.

Thus, in inter-band CA, a base station may not be able to use SSB-less secondary cells for network energy savings unless a different reference signal can be transmitted in that secondary cell for the UE to apply in loop operations. Accordingly for this purpose, aspects of the present disclosure provide that if the base station intends to schedule a PDSCH in an SSB-less secondary cell, the base station may transmit a tracking reference signal (TRS) (e.g., a CSI-RS for time/frequency tracking) in the SSB-less secondary cell for the UE to apply in its SCell loop operations prior to transmitting the PDSCH. Generally, a base station may transmit TRS periodically (e.g., P-TRS), semi-persistently (e.g., SP-TRS), or aperiodically (A-TRS), but here, for purposes of network energy savings using an SSB-less secondary cell, the base station may specifically utilize A-TRS to minimize the number of transmissions of TRS and thus power consumption. For instance, the base station may transmit multiple bursts of A-TRS (also referred to as a multi-burst A-TRS) in the SSB-less secondary cell for the UE to apply in its AGC loop and time/frequency tracking loop prior to receiving a PDCCH or PDSCH in that secondary cell.

One example where the base station may apply such A-TRS is in fast SCell activation. In fast SCell activation, a base station may trigger one or two bursts of A-TRS (or temporary RS), with each burst including two slots and four CSI-RS resources (two CSI-RS resources per slot), for the UE to apply for AGC or time/frequency tracking in activated SCells that are known and belong to frequency range 1 (FR1), that are unknown and belong to FR1, or that belong to frequency range (FR2). For example, in SCells that are known and belong to FR1, one burst may be applied for time/frequency tracking if an SCell measurement cycle is equal to or smaller than a given period of time (e.g., 2400 ms), while if the SCell measurement cycle is greater than this given period of time (e.g., 2400 ms), one burst may be applied for AGC and a separate burst may be applied for time/frequency tracking. In this latter case, a minimum gap between the RS symbol(s) for AGC and the RS symbols for time/frequency acquisition may be one number of slots (e.g., 2 slots) for one subcarrier spacing (e.g., 15 kHz or 30 kHz) and another number of slots (e.g., 3 slots) for another subcarrier spacing (e.g., 60 kHz). In SCells that are unknown and belong to FR1, one burst may be applied for time-frequency tracking. Moreover, another burst may be applied for AGC in an SCell which is contiguous to an active serving cell in a same band (intra-band contiguous CA), if the power difference in the serving cell and the to be activated SCell is smaller than or equal to a threshold (e.g., 6 dB). In SCells belonging to FR2, one burst may be applied for time-frequency tracking if either: at least one active serving cell on that FR2 band and a temporary RS for the target SCell is provided, or if there is no active serving cell on that FR2 band and the SCell to be activated is known to the UE. If however the SCell being activated is unknown to the UE and there is no active serving cell on that FR2 band, a temporary RS may not be used for AGC (although it may or may not be used for time/frequency tracking).

Figure 5:
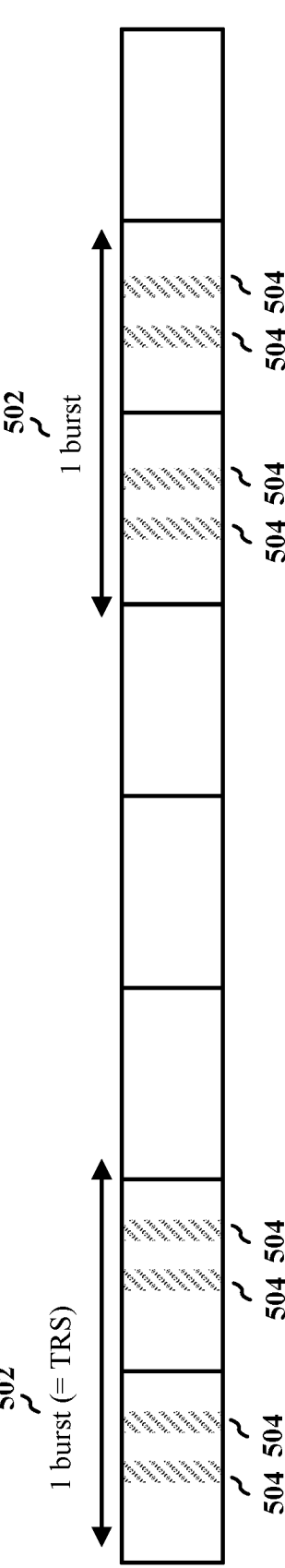
FIG. 5 is a diagram illustrating an example of A-TRS bursts including A-TRS used in fast secondary cell (SCell) activation.

FIG. 5 illustrates an example 500 of A-TRS bursts 502 including A-TRS 504 used in fast SCell activation. To expedite activation of an SCell from a deactivated state, the base station may transmit A-TRS 504 for which the UE may perform the aforementioned loop operations in the SCell. In the illustrated example, two A-TRS bursts are shown each consisting of two slots and four symbols carrying A-TRS. For example, the first A-TRS burst can be used for AGC initialization and the second A-TRS burst can be used for frequency and time tracking. Depending on the deployment scenario (e.g., whether the SCell is known and belongs to FR1, is are unknown and belongs to FR1, or belongs to F2), the base station may transmit one or two A-TRS bursts for the loop operations. If multiple A-TRS bursts are transmitted, a gap may be present between the two bursts (e.g., based on UE capability and network configuration).

Figure 6:
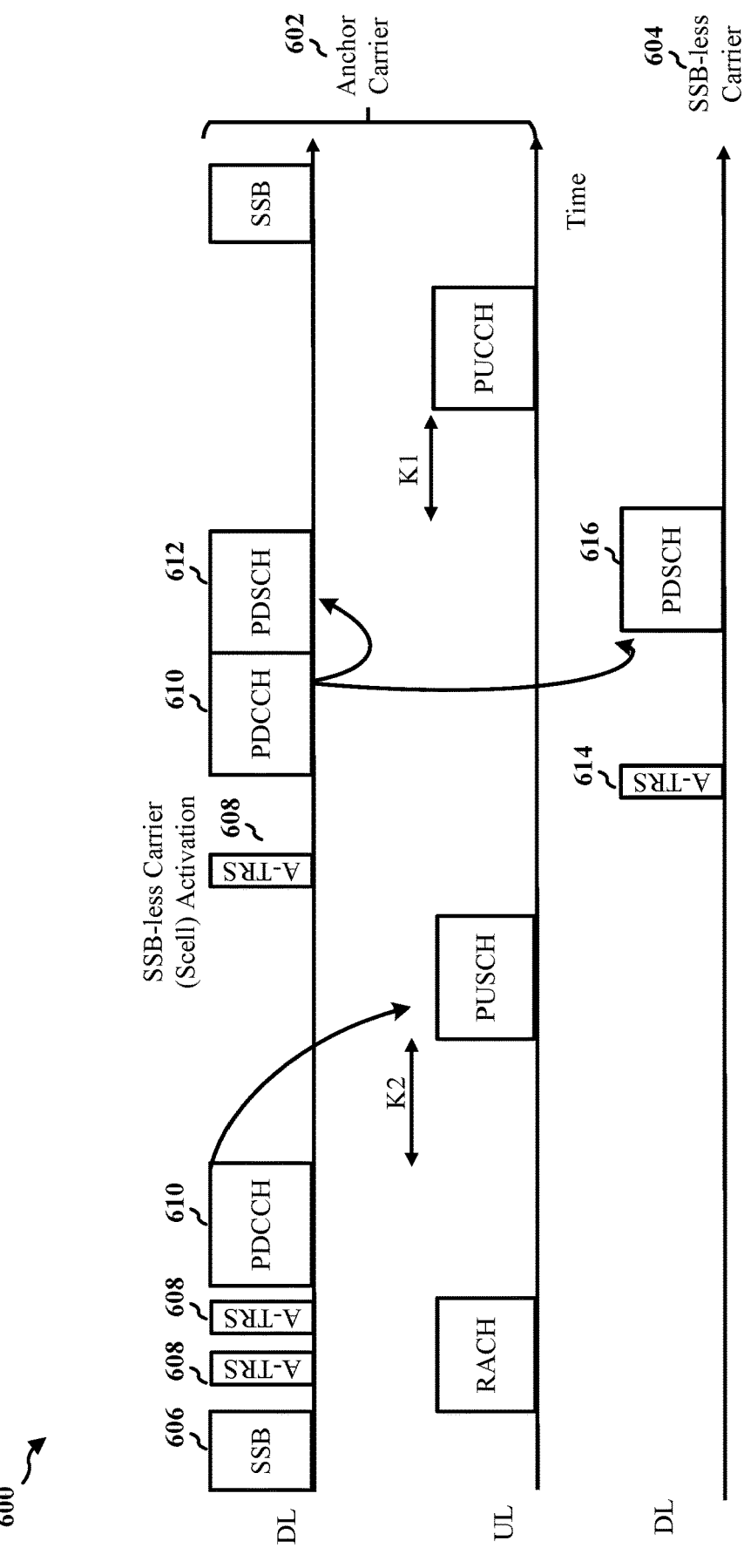
FIG. 6 is a diagram illustrating an example of an inter-band carrier aggregation deployment in which a base station may communicate with a UE over different frequency bands in an anchor cell and a SSB-less secondary cell.

FIG. 6 illustrates an example 600 of an inter-band CA deployment in which a base station may communicate with a UE over different frequency bands in an anchor cell 602 and a SSB-less secondary cell 604. In the anchor cell 602, the base station may transmit SSBs 606, A-TRS 608, PDCCH 610, and PDSCH 612 to the UE, as well as receive corresponding uplink transmissions from the UE (e.g., RACH, PUSCH, PUCCH, etc.), without performing network energy savings. In the SSB-less secondary cell 604, the base station may also transmit A-TRS 614 during fast cell activation of the SSB-less secondary cell 604 for network energy savings. The UE may measure the A-TRS 614 in the SSB-less secondary cell 604 in performance of its loop operations to align or synchronize its AGC loop and time/frequency tracking loops. Later on, when the base station intends to transmit downlink data to the UE in the SSB-less secondary cell 604, the base station may transmit downlink data in a PDSCH 616 intended for the UE in the SSB-less secondary cell 604. Since the UE has already performed AGC and time/frequency synchronization using the A-TRS 614, the UE may receive the scheduled PDSCH in the secondary cell.

Accordingly, a base station may perform fast SCell activation of SSB-less secondary cells using an A-TRS which the UE may apply in its SCell loop operations prior to receiving a PDSCH in the SSB-less secondary cell. However, in such scenarios where the UE receives A-TRS in an SSB-less carrier as in the example of FIG. 6, it would be helpful to specify a preferred A-TRS configuration for such A-TRS (e.g., A-TRS 614). Accordingly, aspects of the present disclosure allow a UE to request (e.g., via UE assistance information) a base station to provide an A-TRS configuration indicating various parameters for the A-TRS which the base station is to transmit in the SSB-less secondary cell, and allow a base station to control transmission of the A-TRS in the SSB-less secondary cell based on a timer derived from the request. Moreover, aspects of the present disclosure allow a base station to trigger A-TRS transmissions in the SSB-less secondary cell via cross-carrier scheduling (e.g., using a DCI in the anchor cell which triggers A-TRS in the SSB-less secondary cell) before initiation of the timer or after expiration of the timer derived from the request. Additionally, aspects of the present disclosure allow a base station to trigger A-TRS transmissions in the SSB-less secondary cell via self-scheduling (e.g., using a DCI in the SSB-less secondary cell which triggers A-TRS and schedules PDSCH in the SSB-less secondary cell) before expiration of the timer derived from the request. As a result, network energy savings provided by SSB-less secondary cells may be accommodated in inter-band CA.

Figure 7:
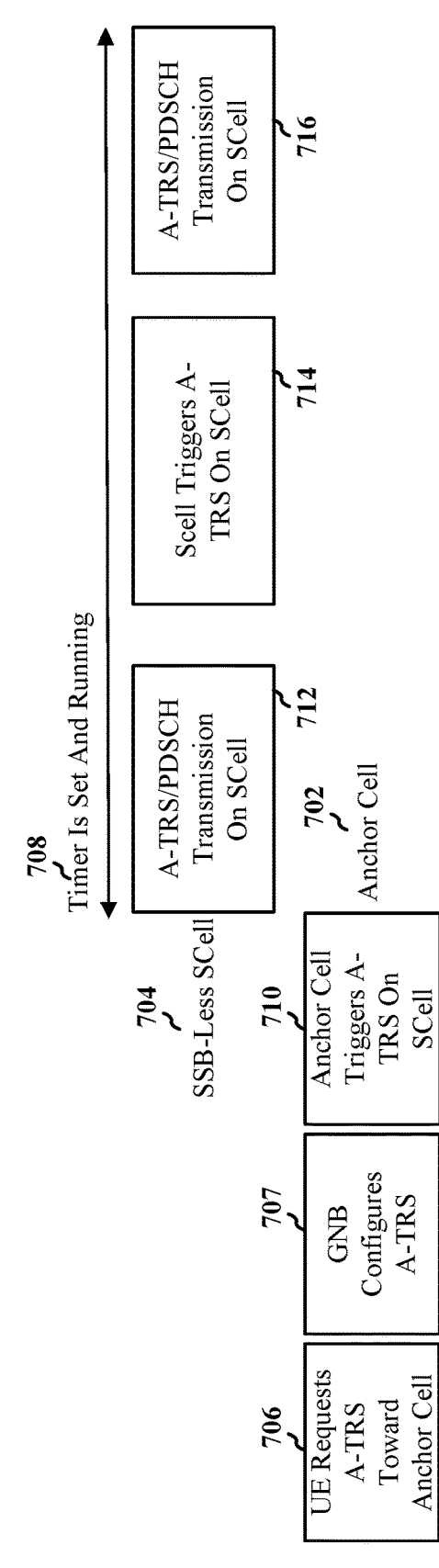
FIG. 7 is a diagram illustrating an example of a timeline for A-TRS requests and transmissions in an anchor cell and an SSB-less secondary cell, respectively.

FIG. 7 illustrates an example 700 of a timeline for A-TRS requests and transmissions in an anchor cell 702 and an SSB-less secondary cell 704, respectively. Initially, at block 706, the UE may transmit a request (e.g., via RRC signaling) in anchor cell 702 to the base station to provide an A-TRS configuration which defines or indicates the parameters of A-TRSs in the SSB-less secondary cell 704. For instance, when the UE establishes connection to the anchor cell 702, the UE may provide UE assistance information to the base station for A-TRS transmission in the SSB-less secondary cell 704. In one example, the UE may transmit a request in anchor cell 702 for a multi-burst A-TRS via a MAC-CE or RRC message (e.g., UE assistance information signaling). This request may include parameters or information which the base station may use to configure the A-TRS. For instance, one parameter the UE may indicate in the request is a target secondary cell for the A-TRS transmission (e.g., an index of the SSB-less secondary cell 704). For example, if the UE is connected to multiple secondary cells on different frequency bands or with different numerologies, the A-TRS configuration may be different for different secondary cells, and so the UE indicates which secondary cell the A-TRS configuration is to be applied via its index. Another parameter the UE may indicate in the request is a TRS bandwidth (a bandwidth of the A-TRS transmission). For example, depending on the loop operations the UE is to perform in the SSB-less secondary cell, the UE may request the base station to transmit the TRS within an entire bandwidth of the secondary cell or within a subset of the bandwidth of the secondary cell, and so the UE may indicate this information in the request. Other parameter(s) the UE may indicate in its request include a number of slots for each TRS burst (e.g., one or two slots per A-TRS burst), a number of TRS bursts (e.g., two TRS bursts), and a slot gap between TRS bursts (e.g., two slots between TRS bursts).

In response to receiving the request at block 706, the base station may transmit to the UE in the anchor cell 702, at block 707, a configuration of the A-TRS using the parameter(s) indicated in the request (e.g., via RRC signaling). For instance, the base station may transmit an RRC configuration at block 707 which configures a multi-burst A-TRS that the base station intends to later transmit in the SSB-less secondary cell 704. This A-TRS configuration may include, for example, a resource set configuration for the A-TRS, such as a non-zero power, channel state information reference signal (NZP-CSI-RS) resource set configuration for a multi-burst A-TRS, and an aperiodic channel state information (A-CSI-RS) trigger state configuration for the A-TRS. The NZP CSI-RS resource set configuration may include for example, a NZP-CSI-RS resource set for one A-TRS burst, a number of A-TRS bursts in a transmission occasion, and a slot gap between A-TRS bursts.

FIG. 8 illustrates an example 800 of a multi-burst A-TRS configuration (e.g., the configuration at block 707 of FIG. 7) based on parameters the UE indicates to the base station in an A-TRS request (e.g., the request at block 706 of FIG. 7). For instance, the UE may request a number of TRS slots 802 for a TRS burst 804, a number of the TRS bursts 804 the base station is to transmit in a transmission occasion 805, and a number of gap slots 806 between the TRS bursts 804. As an example, the UE may request an A-TRS configuration including two TRS slots 802 per TRS burst 804, two TRS bursts 804, and two gap slots 806. Thus, as illustrated in the example of FIG. 8, the A-TRS configuration may include two TRS bursts 804 in an A-TRS transmission occasion, two TRS slots 802 per TRS burst 804, and two gap slots 806 between TRS bursts 804. Alternatively, the UE may request an A-TRS configuration different than that illustrated, such as a configuration including a different number of TRS slots 802 per TRS burst 804, a different number of TRS bursts 804 per TRS occasion, and/or a different number of gap slots 806 between the TRS bursts 804.

Referring back to FIG. 7, the request (e.g., the UE assistance information) may include one or more parameters related to a timer 708 associated with a duration within which the base station may transmit A-TRS in the SSB-less secondary cell 704. For instance, these parameters or time-line information may include a minimum time gap between A-TRS transmission occasions, and a maximum time gap between a last burst of an A-TRS transmission and a subsequent PDCCH/PDSCH transmission in the SSB-less secondary cell 704. Based on the timeline information provided by the UE, the base station may determine the length of time (e.g., the value of timer 708) during which the base station may transmit A-TRSs in the SSB-less secondary cell 704, as well as determine the maximum time after an A-TRS by which the base station may schedule or transmit a PDSCH within this length of time in the SSB-less sec-ondary cell. For instance, if the UE indicates that the minimum time gap between A-TRS transmission occasions is 100 ms, then the base station may transmit a multi-burst A-TRS (e.g., based on the configuration in FIG. 8) in the SSB-less secondary cell with a periodicity of no less than 100 ms. Moreover, if the UE indicates that the maximum time gap between an A-TRS transmission and an associated PDSCH transmission is 200 ms, then the base station may transmit PDCCH/PDSCH in the SSB-less secondary cell no later than 200 ms after transmitting an A-TRS in the SSB-less secondary cell (e.g., a last A-TRS burst in a multi-burst A-TRS transmission).

Moreover, these parameters, and therefore the value of the timer 708 or its periodicity, may change depending on the current channel condition of the UE (e.g., if the UE is stationary or mobile). For instance, if the UE is stationary, the UE may request the base station to transmit multi-burst A-TRS with a larger periodicity (e.g., 200 ms), while if the UE is in a highly mobile situation, the UE may request the base station instead to transmit multi-burst A-TRS with a smaller periodicity (e.g., 40 ms). Thus, through the request, the UE may dynamically indicate the base station to set different values for timer 708 based on the current channel condition of the UE.

Accordingly, a UE may request (e.g., via UE assistance information signaling) a base station in the anchor cell 702 to provide A-TRS in the SSB-less secondary cell 704 according to timer parameters indicated in the request. The anchor cell and SSB-less secondary cell may be in different frequency bands. As a result of the timer-controlled A-TRS, the UE may achieve power alignment or waveform fre-quency/time synchronization in the SSB-less secondary cell using its loop operations, and the UE may receive downlink data in the SSB-less secondary cell accordingly. As a result, the network energy savings provided by the lack of SSB transmissions in SSB-less secondary cells may be accom-modated in inter-band CA.

Originally, when the UE requests an initial A-TRS trans-mission in the SSB-less secondary cell 704 following acti-vation of the SSB-less secondary cell 704, or when the base station intends to provide an A-TRS transmission in the SSB-less secondary cell 704 following a period of inactivity in the SSB-less secondary cell 704 (e.g., following expiration of timer 708), at block 710, the base station may trigger A-TRS using cross-carrier scheduling. For instance, the base station may transmit a DCI (PDCCH) in anchor cell 702 scheduling an A-TRS transmission in the SSB-less secondary cell 704. This triggering PDCCH may include parameters such as a secondary cell index for the SSB-less secondary cell 704 (the target SCell of the cross-carrier scheduling), and an A-TRS trigger state. Here, the base station transmits the trigger (e.g., the DCI) at block 710 in the anchor cell 702, rather than in the SSB-less secondary cell 704 where the A-TRS transmission itself occurs, since the UE may not yet have (or no longer have) a reliable alignment or synchronization of power and waveform frequency/timing from its loop operations in the SSB-less secondary cell 704. Therefore, at this time the base station sends the trigger in anchor cell 702 for A-TRS in SSB-less secondary cell 704 using cross cell triggering at block 710.

After the UE performs loop operations and thus obtains alignment or synchronization of power and waveform frequency/timing in the SSB-less secondary cell 704, the UE may receive PDCCH and PDSCH in the SSB-less secondary cell 704. Accordingly, at block 712, following cross-cell triggering of A-TRS, the base station may transmit A-TRS to the UE in one or more bursts (e.g., according to the format indicated in the A-TRS configuration such as shown in example 800 of FIG. 8). For instance, the base station may transmit A-TRS in a burst including multiple slots, and afterwards PDSCH in a subsequent slot to the UE. The base station may transmit the PDSCH at block 712 no later than the requested, maximum time gap following the A-TRS transmission at block 712. For example, if the maximum time gap indicated in the UE request is 200 ms, the base station may transmit the PDSCH at block 712 no later than 200 ms after the last A-TRS burst transmitted at block 712. The base station may set the timer 708 for A-TRS transmissions in SSB-less secondary cell 704 after the base station sends the trigger at block 710 or the A-TRS at block 712. The timer 708 may be set based at least on the maximum time gap previously described.

After transmitting downlink data to the UE at block 712, the base station may determine that there is still pending (or additional) downlink data intended for the UE. For example, the base station may determine to schedule, via transmission of a DCI in PDCCH, a retransmission of prior data or a new transmission of subsequent data in PDSCH. Alternatively or additionally, the PDSCH transmission at block 712 may be part of a downlink data burst including additional data to be sent to the UE. If at this time, the timer 708 is still running (the timer has not yet expired), the alignment or synchronization of power and waveform frequency/timing which the UE previously achieved in its loop operations in the secondary cell may still be maintained, and therefore the base station may determine that the UE may still be able to successfully receive A-TRS and PDCCH/PDSCH in the SSB-less secondary cell 704.

Thus, while timer 708 is still running, at block 714, the base station may trigger subsequent A-TRS and schedule subsequent PDSCH using self-scheduling. Similarly at block 716, the base station may transmit the subsequent A-TRS in one or more bursts (e.g., according to the format indicated in the A-TRS configuration such as shown in example 800 of FIG. 8) and the subsequent downlink data in PDSCH as a result of the self-scheduling. For instance, the base station may transmit at block 714 a DCI (PDCCH) in SSB-less secondary cell 704 scheduling an A-TRS burst and a PDSCH transmission in a same slot at block 716 in the same SSB-less secondary cell. The base station may transmit the A-TRS burst at block 716 no earlier than the requested, minimum time gap following the A-TRS burst transmission at block 712. For example, if the minimum time gap indicated in the UE request is 100 ms, the base station may transmit a multi-burst A-TRS at block 716 no earlier than 100 ms after transmitting a multi-burst A-TRS at block 712. Moreover, the base station may transmit the PDSCH at block 716 no later than the requested, maximum time gap following the A-TRS transmission at block 716. For example, if the maximum time gap indicated in the UE request is 200 ms, the base station may transmit the PDSCH at block 716 no later than 200 ms after the last A-TRS burst transmitted at block 716.

The base station may also reset the timer 708 for A-TRS transmissions in SSB-less secondary cell 704 at or around the time the base station sends the trigger at block 714 or the A-TRS at block 716. Thus, the base station may continue to (e.g., repeat) the operations of blocks 714 and 716 in SSB-less secondary cell 704 while timer 708 is running as long as there is still downlink data intended for the UE. During this time, similar to the A-TRS transmissions previously described, a respective, subsequent A-TRS transmission may be transmitted no earlier than the minimum time gap (e.g., 100 ms) following a respective, immediately prior A-TRS transmission. Similarly, a respective, subsequent PDSCH transmission may be transmitted no later than the maximum time gap (e.g., 200 ms) following a respective, immediately prior, last A-TRS burst transmission.

Later on, the base station may determine that there is no longer pending (or additional) downlink data remaining to be sent to the UE. For example, the PDSCH transmission at block 716 may be the end of a downlink data burst sent to the UE, and there may be no additional data intended for the UE at this time in SSB-less secondary cell 704. In response to this determination (e.g., that there is not a pending or on-going downlink data transmission), the base station may refrain from or stop transmitting A-TRS in the SSB-less secondary cell 704. As a result, timer 708 may expire. After timer 708 expires, the alignment or synchronization of power and waveform frequency/timing which the UE previously achieved in its loop operations in the secondary cell may no longer be maintained, and therefore the base station may determine that the UE may no longer be able to successfully receive A-TRS and PDCCH/PDSCH in the SSB-less secondary cell 704. For example, the passage of time represented by timer 708 may lead to misalignment or desynchronization of the power and waveform frequency/timing.

As a result, if following expiration of timer 708 the base station intends to transmit downlink data again to the UE, the base station may repeat the aforementioned operation of A-TRS triggering using cross-carrier scheduling at block 710. For instance, the base station may again transmit DCI in anchor cell 702 triggering A-TRS and scheduling PDSCH in SSB-less secondary cell 704. The base station may repeat this operation without requiring another request to be transmitted from the UE at block 706 or another A-TRS configuration to be transmitted to the UE at block 707. From the A-TRS, the UE may again be able to obtain alignment or synchronization of power and waveform frequency/timing in the SSB-less secondary cell 704, and afterwards the UE may again receive downlink data in the SSB-less secondary cell 704 as previously described (e.g., with respect to the operations of blocks 712, 714, and 716).

Figure 9:
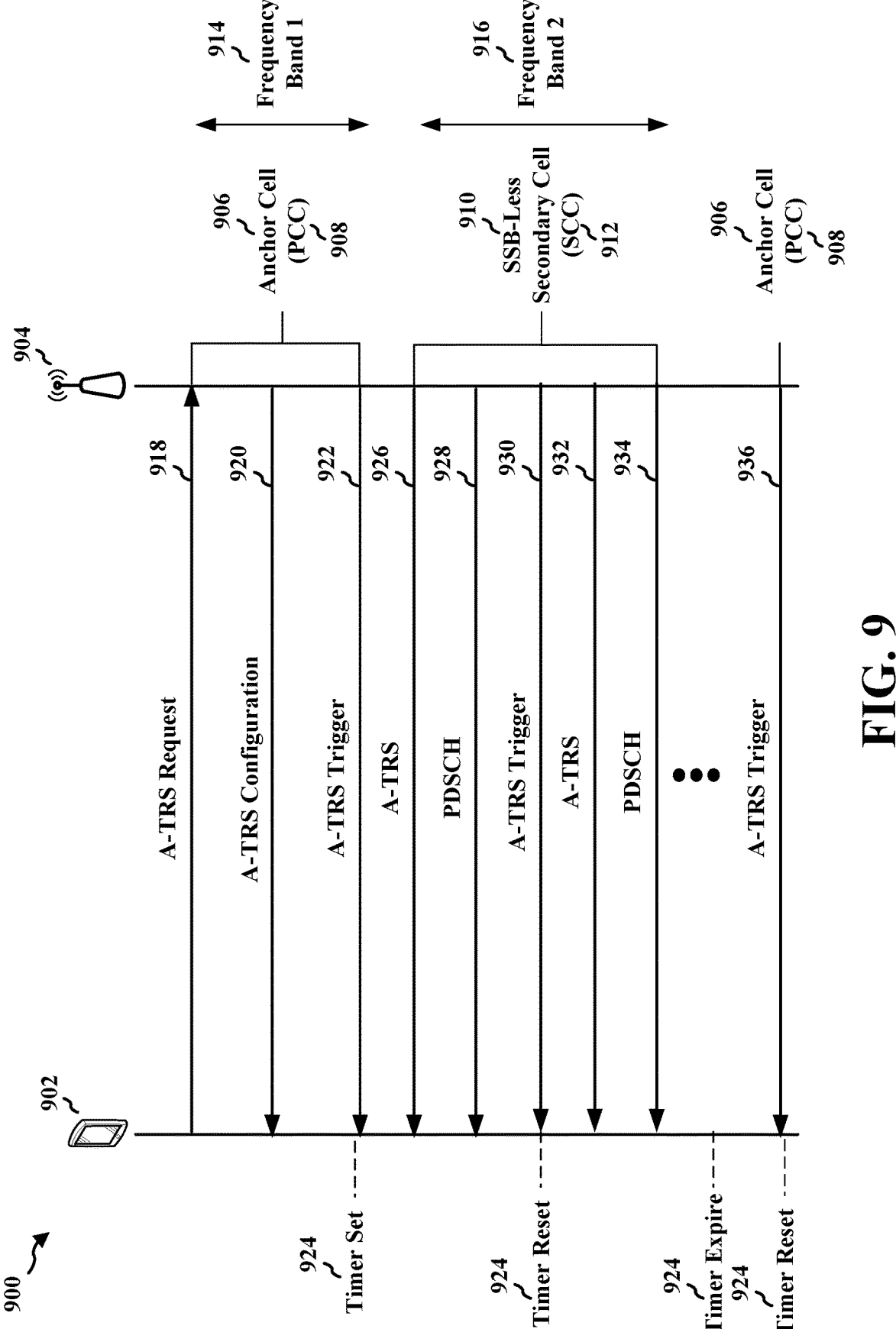
FIG. 9 is a diagram illustrating an example of a call flow between a UE and a base station.

FIG. 9 illustrates an example 900 of a call flow between a UE 902 and a base station 904 communicating in an anchor cell 906 via a primary component carrier (PCC) 908 and in an SSB-less secondary cell 910 via a secondary component carrier (SCC) 912. The anchor cell 906 or PCC 908 may be on one frequency band 914, and the SSB-less secondary cell 910 or SCC 912 may be on another, different frequency band 916.

Initially, the UE 902 transmits an A-TRS request 918 to the base station 904 in the anchor cell 906. A-TRS request 918 may correspond to the request the UE transmits at block 706 of FIG. 7. In response to the A-TRS request 918, the base station 904 transmits an A-TRS configuration 920 to the UE 902 in anchor cell 906. A-TRS configuration 920 may correspond to the configuration the base station transmits at block 707 of FIG. 7, such as the configuration illustrated in the example 800 of FIG. 8. Base station 904 may also transmit an A-TRS trigger 922 (e.g., DCI) to UE 902 in anchor cell 906. A-TRS trigger 922 may correspond to the cross-carrier trigger the base station transmits at block 710 of FIG. 7. The base station 904 may also set a timer 924 for A-TRS transmissions in SSB-less secondary cell 910 in response to A-TRS trigger 922. Timer 924 may correspond to the timer 708 in FIG. 7.

While timer 924 is running, base station 904 may transmit A-TRS 926 and a PDSCH 928 to UE 902 in SSB-less secondary cell 910. The transmission of A-TRS 926 and PDSCH 928 may correspond to the transmission of same signals at block 712 of FIG. 7. If downlink data transmission is still ongoing, the base station 904 may transmit a subsequent A-TRS trigger 930 to UE 902 in SSB-less secondary cell 910 as well as reset the timer 924. Subsequent A-TRS trigger 930 may correspond to the self-scheduling trigger the base station transmits at block 714 of FIG. 7. While timer 924 remains running, base station 904 may transmit subsequent A-TRS 932 and a subsequent PDSCH 934 to UE 902 in SSB-less secondary cell 910. The transmission of subsequent A-TRS 932 and subsequent PDSCH 934 may correspond to the transmission of same signals at block 716 of FIG. 7.

If no pending downlink data transmission remains, the base station 904 may stop transmitting A-TRS to UE 902, and timer 924 may expire. Following expiration of timer 924, if base station 904 has new downlink data to transmit to UE 902, base station 904 may transmit subsequent A-TRS trigger 936 to UE 902 again in anchor cell 906. Subsequent A-TRS trigger 936 may correspond to the cross-carrier trigger the base station transmits at block 710 of FIG. 7. The base station 904 may also reset the timer 924 in response to subsequent A-TRS trigger 936.

FIG. 10 is a flowchart 1000 of a method of wireless communication. The method may be performed by a UE (e.g., the UE 104, 350, 902; the apparatus 1202). Optional aspects are illustrated in dashed lines. The method allows a UE to request, in an anchor carrier, a base station to configure and transmit A-TRS transmissions, in an SSB-less secondary carrier, for improved reception performance of downlink data transmissions in the secondary carrier, thereby allowing for the network energy savings provided by SSB-less secondary carriers to be obtained in inter-band CA.

At 1002, the UE may transmit, in a first cell, a request for an A-TRS. For example, 1002 may be performed by request component 1240. For instance, referring to the Figures, at block 706, the UE 902 may transmit, in anchor cell 602, 702, 906, A-TRS request 918 for A-TRS 504, 614 (e.g., A-TRS bursts 502).

At 1004, the UE may receive, in the first cell, a configuration of the A-TRS in response to the request. For example, 1004 may be performed by configuration component 1242. For instance, referring to the Figures, at block 707, the UE 902 may receive, in anchor cell 602, 702, 906, A-TRS configuration 920 in response to A-TRS request 918.

In one example, the configuration may include at least one of: a resource set configuration for the A-TRS, or an A-CSI-RS trigger state for the A-TRS. In one example, the resource set configuration may include at least one of: a NZP-CSI-RS resource set for an A-TRS burst, a quantity of A-TRS bursts in a transmission occasion including the A-TRS, or a time gap between each of the A-TRS bursts. For instance, referring to the Figures, the A-TRS configuration 920 which UE 902 receives at block 707 may include, for example, a resource set configuration for the A-TRS 504, 614, such as NZP-CSI-RS resource set configuration for a multi-burst A-TRS (e.g., A-TRS bursts 502), and an A-CSI-RS trigger state configuration for the A-TRS 504, 614. The NZP CSI-RS resource set configuration may include for example, a NZP-CSI-RS resource set for one A-TRS burst (e.g., TRS burst 804), a number of A-TRS bursts in a transmission occasion (e.g., transmission occasion 805 at block 712, transmission occasion 805 at block 716), and a slot gap between A-TRS bursts (e.g., the time period encompassed by gap slot(s) 806).

At 1006, the UE may receive, in the first cell, a trigger of the A-TRS in a second cell lacking SSB transmissions following the configuration. For example, 1006 may be performed by trigger component 1244. For instance, referring to the Figures, at block 710, the UE 902 may receive in anchor cell 602, 702, 906, A-TRS trigger 922 which schedules or activates A-TRS 504, 614 in SSB-less secondary cell 604, 704, 910 following UE reception of the A-TRS configuration 920.

In one example, the trigger is DCI. In one example, the trigger includes a serving cell index for the second cell, and a trigger state for the A-TRS. For instance, referring to the Figures, the A-TRS trigger 922 may be a DCI (PDCCH) in anchor cell 702 scheduling an A-TRS transmission in the SSB-less secondary cell 704. This triggering PDCCH may include parameters such as a secondary cell index for the SSB-less secondary cell 704 (the target SCell of the cross-carrier scheduling), and an A-TRS trigger state.

In one example, the first cell may be an anchor cell served by a first component carrier in a first frequency band, and the second cell may be a secondary cell served by a second component carrier in a second frequency band, the second frequency band being different than the first frequency band. For instance, referring to the Figures, anchor cell 602, 702, 906 may be served by anchor carrier 402 (e.g., PCC 908) in one frequency band 914 (e.g., a 2 GHz frequency band), and SSB-less secondary cell 604, 704, 910 may be served by SSB-less secondary carrier 406 (e.g., SCC 912) in different frequency band 916 (e.g., a 3 GHz frequency band).

In one example, the request may include UE assistance information indicating at least one of: the second cell in which the A-TRS is to be received, a bandwidth associated with the A-TRS, a quantity of A-TRS bursts in a transmission occasion including the A-TRS, a quantity of slots for each of the A-TRS bursts, or a time gap between each of the A-TRS bursts. For instance, referring to the Figures, the A-TRS request 918 which UE 902 transmits at block 706 may be signaled via a MAC-CE or RRC message (e.g., UE assistance information signaling) and include parameters or information which the base station 904 may use to configure the A-TRS 504, 614. For example, one parameter the UE

902 may indicate in the A-TRS request 918 is a target secondary cell for the A-TRS transmission (e.g., an index of the SSB-less secondary cell 604, 704, 910). Another parameter the UE 902 may indicate in the A-TRS request 918 is a TRS bandwidth (a bandwidth of the A-TRS transmission). Other parameter(s) the UE 902 may indicate in the A-TRS request 918 may include a number of slots for each TRS burst (e.g., one or two slots per A-TRS burst), a number of TRS bursts (e.g., two TRS bursts), and a slot gap between TRS bursts (e.g., two slots between TRS bursts). For example, as illustrated in FIG. 8, the UE may request a number of TRS slots 802 for a TRS burst 804, a number of the TRS bursts 804 the base station is to transmit in a given transmission occasion 805, and a number of gap slots 806 between the TRS bursts 804.

In one example, the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell. For instance, referring to the Figures, the A-TRS request 918 which UE 902 transmits at block 706 may include one or more parameters related to timer 708, 924 associated with a duration within which the base station 904 may transmit A-TRS 504, 614 in the SSB-less secondary cell 604, 704, 910. One parameter or timeline information may include a minimum time gap between A-TRS transmission occasions (e.g., between transmission occasions 805 at blocks 712 and 716, respectively). For example, if the minimum time gap indicated in the UE request is 100 ms, the base station may transmit a multi-burst A-TRS at block 716 no earlier than 100 ms after transmitting a multi-burst A-TRS at block 712. Another parameter or timeline information may include a maximum time gap between a last burst of an A-TRS transmission and a subsequent PDCCH/PDSCH transmission in the SSB-less secondary cell 604, 704, 910 (e.g., between a last one of TRS bursts 804 in transmission occasion 805 at block 712 and a downlink data transmission in the SSB-less secondary cell). For example, if the maximum time gap indicated in the UE request is 200 ms, the base station may transmit the PDSCH at block 712 (or block 716) no later than 200 ms after the last A-TRS burst transmitted at block 712 (or block 716, respectively).

In one example, the trigger which the UE may receive at 1006 may activate a timer based on the timeline information. For instance, referring to the Figures, based on the timeline information provided by the UE in A-TRS request 918 (e.g., the minimum time gap and/or maximum time gap), the base station 904 may determine the length of time (e.g., the value of timer 708, 924) during which the base station may transmit A-TRSs 504, 614 in the SSB-less secondary cell 604, 704, 910. Using this determined length of time, the A-TRS trigger 922 which the base station 904 transmits at block 710 may then set and activate the timer 708, 924 for A-TRS transmissions in SSB-less secondary cell 604, 704, 910.

At 1008, the UE may receive, in the second cell lacking SSB transmissions, the A-TRS based on the request. For example, 1008 may be performed by A-TRS component 1246. For instance, referring to the Figures, at block 712, UE 902 may receive A-TRS 926 followed by PDSCH 928 in SSB-less secondary cell 604, 704, 910. The A-TRS 926 (e.g., A-TRS 504, 614) may be received at block 712 in one or more TRS bursts 804 according to the A-TRS configuration 920 (e.g., such as illustrated in example 800 of FIG.

8), which configuration's parameters had been indicated by or derived from the A-TRS request 918.

At 1010, after the timer is activated (e.g., by the trigger at 1006), the UE may receive, in the second cell, a subsequent trigger for a subsequent A-TRS in the second cell before expiration of the timer. The timer may be reset in response to the subsequent trigger. For example, 1010 may be performed by subsequent trigger component 1248. For instance, referring to the Figures, subsequent to the UE 902 receiving A-TRS trigger 922 in anchor cell 602, 702, 906 activating timer 708, 924 at block 710, and while timer 708, 924 is still running, there may still be pending (or additional) downlink data intended for the UE 902. As a result, at block 714, UE 902 may receive subsequent A-TRS trigger 930 in SSB-less secondary cell 604, 704, 910 which schedules or activates A-TRS 504, 614 in SSB-less secondary cell 604, 704, 910. For instance, the base station 904 may transmit a DCI (PDCCH) in SSB-less secondary cell 604, 704, 910 which schedules transmission of A-TRS 932 and PDSCH 934 at block 716 in the same SSB-less secondary cell. The subsequent A-TRS trigger 930 which the base station 904 transmits at block 714 may also reset the timer 708, 924 for A-TRS transmissions in SSB-less secondary cell 604, 704, 910.

At 1012, after the timer is activated (e.g., by the trigger at 1006 or 1010), the UE may receive, in the first cell, a subsequent trigger for a subsequent A-TRS in the second cell after expiration of the timer. The timer may be reset in response to the subsequent trigger. For example, 1012 may be performed by subsequent trigger component 1248. For instance, referring to the Figures, subsequent to the UE 902 receiving A-TRS trigger 922 in anchor cell 602, 702, 906 activating timer 708, 924 at block 710 (or after the UE 902 receives subsequent A-TRS trigger 930 in SSB-less secondary cell 604, 704, 910 re-activating timer 708, 924 at block 714), there may no longer be pending (or additional) downlink data intended for the UE 902, and so timer 708, 924 may expire. As a result, the aforementioned operation of cross-carrier A-TRS triggering at block 710 may repeat, in which case the UE 902 may receive subsequent A-TRS trigger 936 in anchor cell 602, 702, 906 which schedules or activates A-TRS 504, 614 in SSB-less secondary cell 604, 704, 910. For instance, the base station 904 may transmit a DCI (PDCCH) in anchor cell 602, 702, 906 which schedules transmission of A-TRS and PDSCH in the SSB-less secondary cell 604, 704, 910. The subsequent A-TRS trigger 936 may also reset the timer 708, 924 for A-TRS transmissions in SSB-less secondary cell 604, 704, 910. Thus, following timer reset, the UE 902 may repeat the aforementioned operations of A-TRS/PDSCH reception and subsequent A-TRS triggering beginning again at 1008.

FIG. 11 is a flowchart 1100 of a method of wireless communication. The method may be performed by a base station (e.g., the base station 102/180, 310, 904; the apparatus 1302. Optional aspects are illustrated in dashed lines. The method allows a base station, in response to a UE request in an anchor carrier, to configure and transmit A-TRS transmissions in an SSB-less secondary carrier, for improved reception performance of downlink data transmissions in the secondary carrier, thereby allowing for the network energy savings provided by SSB-less secondary carriers to be obtained in inter-band CA.

At 1102, the base station may receive, in a first cell, a request for an A-TRS. For example, 1102 may be performed by request component 1340. For instance, referring to the Figures, at block 706, the base station 904 may receive, in anchor cell 602, 702, 906, A-TRS request 918 for A-TRS 504, 614 (e.g., A-TRS bursts 502).

At 1104, the base station may transmit, in the first cell, a configuration of the A-TRS in response to the request. For example, 1104 may be performed by configuration component 1342. For instance, referring to the Figures, at block 707, the base station 904 may transmit, in anchor cell 602, 702, 906, A-TRS configuration 920 in response to A-TRS request 918.

In one example, the configuration may include at least one of: a resource set configuration for the A-TRS, or an A-CSI-RS trigger state for the A-TRS. In one example, the resource set configuration may include at least one of: a NZP-CSI-RS resource set for an A-TRS burst, a quantity of A-TRS bursts in a transmission occasion including the A-TRS, or a time gap between each of the A-TRS bursts. For instance, referring to the Figures, the A-TRS configuration 920 which base station 904 transmits at block 707 may include, for example, a resource set configuration for the A-TRS 504, 614, such as NZP-CSI-RS resource set configuration for a multi-burst A-TRS (e.g., A-TRS bursts 502), and an A-CSI-RS trigger state configuration for the A-TRS 504, 614. The NZP CSI-RS resource set configuration may include for example, a NZP-CSI-RS resource set for one A-TRS burst (e.g., TRS burst 804), a number of A-TRS bursts in a transmission occasion (e.g., transmission occasion 805 at block 712, transmission occasion 805 at block 716), and a slot gap between A-TRS bursts (e.g., the time period encompassed by gap slot(s) 806).

At 1106, the base station may transmit, in the first cell, a trigger of the A-TRS in a second cell lacking SSB transmissions following the configuration. For example, 1106 may be performed by trigger component 1344. For instance, referring to the Figures, at block 710, the base station 904 may transmit in anchor cell 602, 702, 906, A-TRS trigger 922 which schedules or activates A-TRS 504, 614 in SSB-less secondary cell 604, 704, 910 following base station transmission of the A-TRS configuration 920.

In one example, the trigger is DCI. In one example, the trigger includes a serving cell index for the second cell, and a trigger state for the A-TRS. For instance, referring to the Figures, the A-TRS trigger 922 may be a DCI (PDCCH) in anchor cell 702 scheduling an A-TRS transmission in the SSB-less secondary cell 704. This triggering PDCCH may include parameters such as a secondary cell index for the SSB-less secondary cell 704 (the target SCell of the cross-carrier scheduling), and an A-TRS trigger state.

In one example, the first cell may be an anchor cell served by a first component carrier in a first frequency band, and the second cell may be a secondary cell served by a second component carrier in a second frequency band, the second frequency band being different than the first frequency band. For instance, referring to the Figures, anchor cell 602, 702, 906 may be served by anchor carrier 402 (e.g., PCC 908) in one frequency band 914 (e.g., a 2 GHz frequency band), and SSB-less secondary cell 604, 704, 910 may be served by SSB-less secondary carrier 406 (e.g., SCC 912) in different frequency band 916 (e.g., a 3 GHz frequency band).

In one example, the request may include UE assistance information indicating at least one of: the second cell in which the A-TRS is to be received, a bandwidth associated with the A-TRS, a quantity of A-TRS bursts in a transmission occasion including the A-TRS, a quantity of slots for each of the A-TRS bursts, or a time gap between each of the A-TRS bursts. For instance, referring to the Figures, the A-TRS request 918 which base station 904 receives at block 706 may be signaled via a MAC-CE or RRC message (e.g., UE assistance information signaling) and include parameters or information which the base station 904 may use to configure the A-TRS 504, 614. For example, one parameter the UE 902 may indicate in the A-TRS request 918 is a target secondary cell for the A-TRS transmission (e.g., an index of the SSB-less secondary cell 604, 704, 910). Another parameter the UE 902 may indicate in the A-TRS request 918 is a TRS bandwidth (a bandwidth of the A-TRS transmission). Other parameter(s) the UE 902 may indicate in the A-TRS request 918 may include a number of slots for each TRS burst (e.g., one or two slots per A-TRS burst), a number of TRS bursts (e.g., two TRS bursts), and a slot gap between TRS bursts (e.g., two slots between TRS bursts). For example, as illustrated in FIG. 8, the UE may request a number of TRS slots 802 for a TRS burst 804, a number of the TRS bursts 804 the base station is to transmit in a given transmission occasion 805, and a number of gap slots 806 between the TRS bursts 804.

In one example, the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell. For instance, referring to the Figures, the A-TRS request 918 which base station 904 receives at block 706 may include one or more parameters related to timer 708, 924 associated with a duration within which the base station 904 may transmit A-TRS 504, 614 in the SSB-less secondary cell 604, 704, 910. One parameter or timeline information may include a minimum time gap between A-TRS transmission occasions (e.g., between transmission occasions 805 at blocks 712 and 716, respectively). For example, if the minimum time gap indicated in the UE request is 100 ms, the base station may transmit a multi-burst A-TRS at block 716 no earlier than 100 ms after transmitting a multi-burst A-TRS at block 712. Another parameter or timeline information may include a maximum time gap between a last burst of an A-TRS transmission and a subsequent PDCCH/PDSCH transmission in the SSB-less secondary cell 604, 704, 910 (e.g., between a last one of TRS bursts 804 in transmission occasion 805 at block 712 and a downlink data transmission in the SSB-less secondary cell). For example, if the maximum time gap indicated in the UE request is 200 ms, the base station may transmit the PDSCH at block 712 (or block 716) no later than 200 ms after the last A-TRS burst transmitted at block 712 (or block 716, respectively).

In one example, the trigger which the base station may transmit at 1106 may activate a timer based on the timeline information. For instance, referring to the Figures, based on the timeline information provided by the UE in A-TRS request 918 (e.g., the minimum time gap and/or maximum time gap), the base station 904 may determine the length of time (e.g., the value of timer 708, 924) during which the base station may transmit A-TRSs 504, 614 in the SSB-less secondary cell 604, 704, 910. Using this determined length of time, the A-TRS trigger 922 which the base station 904 transmits at block 710 may then set and activate the timer 708, 924 for A-TRS transmissions in SSB-less secondary cell 604, 704, 910.

At 1108, the base station may transmit, in the second cell lacking SSB transmissions, the A-TRS based on the request. For example, 1108 may be performed by A-TRS component 1346. For instance, referring to the Figures, at block 712, base station 904 may transmit A-TRS 926 followed by PDSCH 928 in SSB-less secondary cell 604, 704, 910. The A-TRS 926 (e.g., A-TRS 504, 614) may be transmitted at block 712 in one or more TRS bursts 804 according to the A-TRS configuration 920 (e.g., such as illustrated in example 800 of FIG. 8), which configuration's parameters had been indicated by or derived from the A-TRS request 918.

At 1110, after the timer is activated (e.g., by the trigger at 1106), the base station may transmit, in the second cell, a subsequent trigger for a subsequent A-TRS in the second cell before expiration of the timer. The timer may be reset in response to the subsequent trigger. For example, 1110 may be performed by subsequent trigger component 1348. For instance, referring to the Figures, subsequent to the UE 902 receiving A-TRS trigger 922 in anchor cell 602, 702, 906 activating timer 708, 924 at block 710, and while timer 708, 924 is still running, there may still be pending (or additional) downlink data intended for the UE 902. As a result, at block 714, base station 904 may transmit subsequent A-TRS trigger 930 in SSB-less secondary cell 604, 704, 910 which schedules or activates A-TRS 504, 614 in SSB-less secondary cell 604, 704, 910. For instance, the base station 904 may transmit a DCI (PDCCH) in SSB-less secondary cell 604, 704, 910 which schedules transmission of A-TRS 932 and PDSCH 934 at block 716 in the same SSB-less secondary cell. The subsequent A-TRS trigger 930 which the base station 904 transmits at block 714 may also reset the timer 708, 924 for A-TRS transmissions in SSB-less secondary cell 604, 704, 910.

At 1112, after the timer is activated (e.g., by the trigger at 1106 or 1110), the base station may transmit, in the first cell, a subsequent trigger for a subsequent A-TRS in the second cell after expiration of the timer. The timer may be reset in response to the subsequent trigger. For example, 1112 may be performed by subsequent trigger component 1348. For instance, referring to the Figures, subsequent to the UE 902 receiving A-TRS trigger 922 in anchor cell 602, 702, 906 activating timer 708, 924 at block 710 (or after the UE 902 receives subsequent A-TRS trigger 930 in SSB-less secondary cell 604, 704, 910 re-activating timer 708, 924 at block 714), there may no longer be pending (or additional) downlink data intended for the UE 902, and so timer 708, 924 may expire. As a result, the aforementioned operation of cross-carrier A-TRS triggering at block 710 may repeat, in which case the base station 904 may transmit subsequent A-TRS trigger 936 in anchor cell 602, 702, 906 which schedules or activates A-TRS 504, 614 in SSB-less secondary cell 604, 704, 910. For instance, the base station 904 may transmit a DCI (PDCCH) in anchor cell 602, 702, 906 which schedules transmission of A-TRS and PDSCH in the SSB-less secondary cell 604, 704, 910. The subsequent A-TRS trigger 936 may also reset the timer 708, 924 for A-TRS transmissions in SSB-less secondary cell 604, 704, 910. Thus, following timer reset, the base station 904 may repeat the aforementioned operations of A-TRS/PDSCH transmission and subsequent A-TRS triggering beginning again at 1108.

Figure 12:
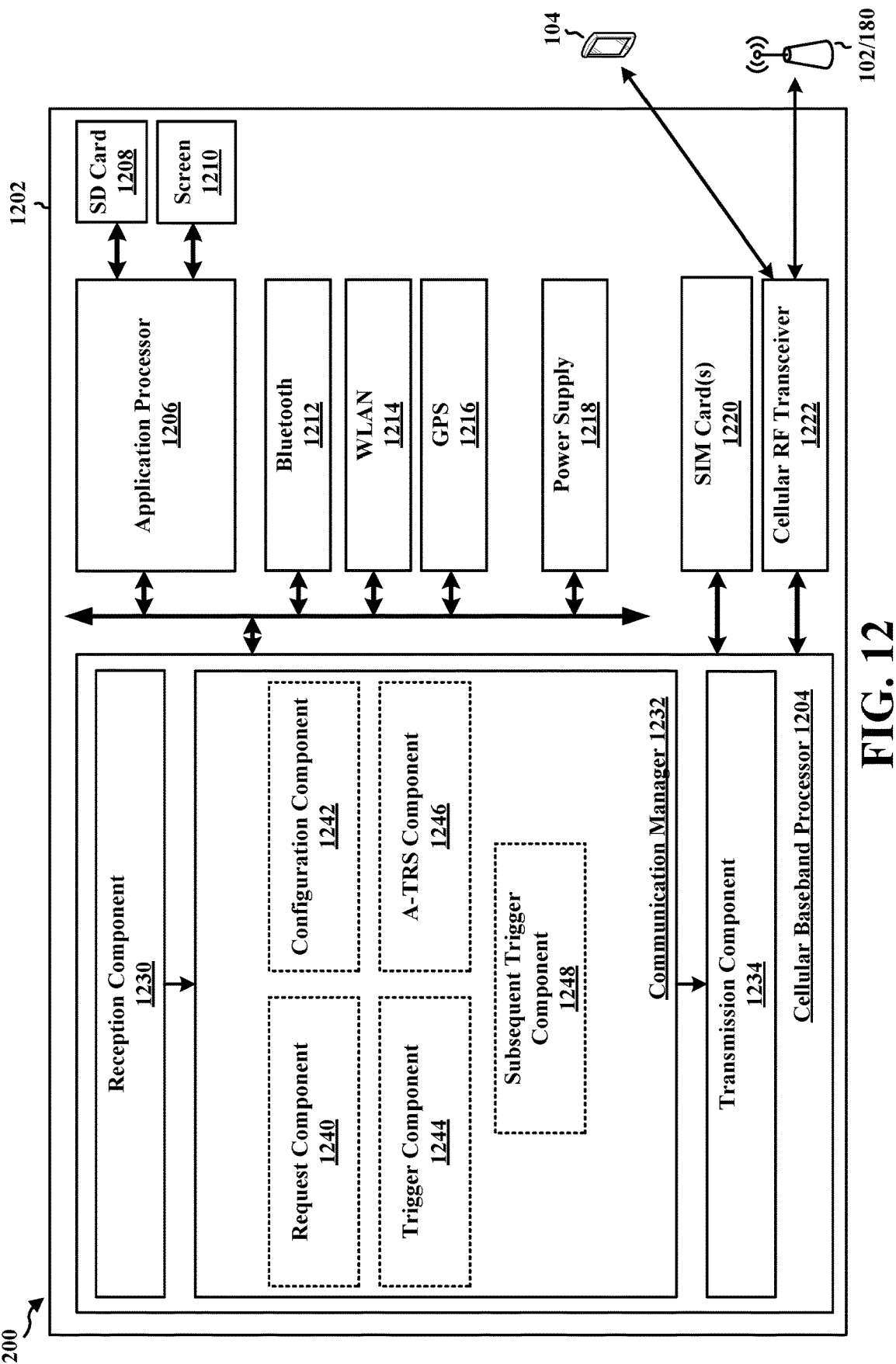
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a request component 1240 that is configured to transmit, in a first cell, a request for an A-TRS, e.g., as described in connection with 1002. The communication manager 1232 further includes a configuration component 1242 that is configured to receive, in the first cell, a configuration of the A-TRS in response to the request, e.g., as described in connection with 1004. The communication manager 1232 further includes a trigger component 1244 that is configured to receive, in the first cell, a trigger of the A-TRS in a second cell lacking SSB transmissions following the configuration, e.g., as described in connection with 1006. The communication manager 1232 further includes an A-TRS component 1246 that is configured to receive, in the second cell lacking SSB transmissions, the A-TRS based on the request, e.g., as described in connection with 1008. The communication manager 1232 further includes a subsequent trigger component 1248 that is configured to receive, in the second cell, a subsequent trigger for a subsequent A-TRS in the second cell before expiration of the timer, wherein the timer is reset in response to the subsequent trigger, e.g., as described in connection with 1010. The subsequent trigger component 1248 is further configured to receive, in the first cell, a subsequent trigger for a subsequent A-TRS in the second cell after expiration of the timer, wherein the timer is reset in response to the subsequent trigger, e.g., as described in connection with 1012.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting, in a first cell, a request for an aperiodic tracking reference signal (A-TRS); and means for receiving, in a second cell lacking synchronization signal block (SSB) transmissions, the A-TRS based on the request.

In one configuration, the first cell is an anchor cell served by a first component carrier in a first frequency band, and the second cell is a secondary cell served by a second component carrier in a second frequency band, the second frequency band being different than the first frequency band.

In one configuration, the request includes UE assistance information indicating at least one of: the second cell in which the A-TRS is to be received, a bandwidth associated with the A-TRS, a quantity of A-TRS bursts in a transmission occasion including the A-TRS, a quantity of slots for each of the A-TRS bursts, or a time gap between each of the A-TRS bursts.

In one configuration, the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell. In one configuration, the means for receiving is further configured to receive, in the first cell, a trigger of the A-TRS in the second cell following an A-TRS configuration responsive to the request, wherein the trigger activates a timer based on the timeline information.

In one configuration, the means for receiving is further configured to receive, in the first cell, a configuration of the A-TRS in response to the request; and to receive, in the first cell, a trigger of the A-TRS in the second cell following the configuration.

In one configuration, the configuration includes at least one of: a resource set configuration for the A-TRS, or an aperiodic, channel state information reference signal (A-CSI-RS) trigger state for the A-TRS. In one configuration, the resource set configuration includes at least one of: a non-zero power, channel state information reference signal (NZP-CSI-RS) resource set for an A-TRS burst, a quantity of A-TRS bursts in a transmission occasion including the A-TRS, or a time gap between each of the A-TRS bursts.

In one configuration, the trigger activates a timer, and the means for receiving is further configured to receive, in the second cell, a subsequent trigger for a subsequent A-TRS in the second cell before expiration of the timer, wherein the timer is reset in response to the subsequent trigger.

In one configuration, the trigger activates a timer, and the means for receiving is further configured to receive, in the first cell, a subsequent trigger for a subsequent A-TRS in the second cell after expiration of the timer, wherein the timer is reset in response to the subsequent trigger.

In one configuration, the trigger is downlink control information (DCI).

In one configuration, the trigger includes: a serving cell index for the second cell; and a trigger state for the A-TRS.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
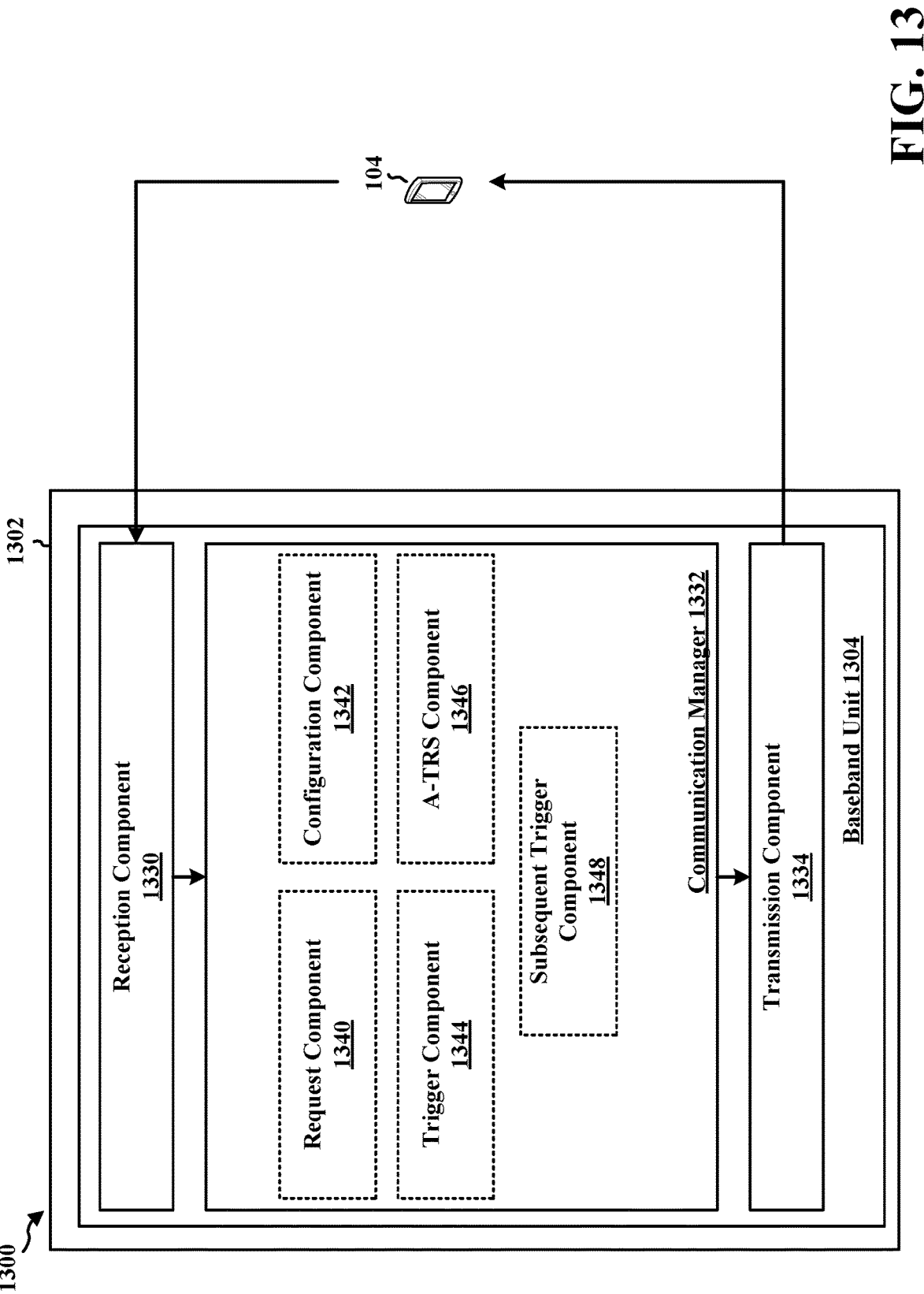
FIG. 13 is a diagram illustrating another example of a hardware implementation for another example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a request component 1340 that is configured to receive, in a first cell, a request for an A-TRS, e.g., as described in connection with 1102. The communication manager 1332 further includes a configuration component 1342 that is configured to transmit, in the first cell, a configuration of the A-TRS in response to the request, e.g., as described in connection with 1104. The communication manager 1332 further includes a trigger component 1344 that is configured to transmit, in the first cell, a trigger of the A-TRS in a second cell lacking SSB transmissions following the configuration, e.g., as described in connection with 1106. The communication manager 1332 further includes an A-TRS component 1346 that is configured to transmit, in the second cell lacking SSB transmissions, the A-TRS based on the request, e.g., as described in connection with 1108. The communication manager 1332 further includes a subsequent trigger component 1348 that is configured to transmit, in the second cell, a subsequent trigger for a subsequent A-TRS in the second cell before expiration of the timer, wherein the timer is reset in response to the subsequent trigger, e.g., as described in connection with 1110. The subsequent trigger component 1348 is further configured to transmit, in the first cell, a subsequent trigger for a subsequent A-TRS in the second cell after expiration of the timer, wherein the timer is reset in response to the subsequent trigger, e.g., as described in connection with 1112.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving, in a first cell, a request for an aperiodic tracking reference signal (A-TRS); and means for transmitting, in a second cell lacking synchronization signal block (SSB) transmissions, the A-TRS based on the request.

In one configuration, the first cell is an anchor cell served by a first component carrier in a first frequency band, and the second cell is a secondary cell served by a second component carrier in a second frequency band, the second frequency band being different than the first frequency band.

In one configuration, the request includes UE assistance information indicating at least one of: the second cell in which the A-TRS is to be received, a bandwidth associated with the A-TRS, a quantity of A-TRS bursts in a transmission occasion including the A-TRS, a quantity of slots for each of the A-TRS bursts, or a time gap between each of the A-TRS bursts.

In one configuration, the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell. In one configuration, the means for transmitting is further configured to transmit, in the first cell, a trigger of the A-TRS in the second cell following an A-TRS configuration responsive to the request, wherein the trigger activates a timer based on the timeline information.

In one configuration, the means for transmitting is further configured to transmit, in the first cell, a configuration of the A-TRS in response to the request; and to transmit, in the first cell, a trigger of the A-TRS in the second cell following the configuration.

In one configuration, the configuration includes at least one of: a resource set configuration for the A-TRS, or an aperiodic, channel state information reference signal (A-CSI-RS) trigger state for the A-TRS. In one configuration, the resource set configuration includes at least one of: a non-zero power, channel state information reference signal (NZP-CSI-RS) resource set for an A-TRS burst, a quantity of A-TRS bursts in a transmission occasion including the A-TRS, or a time gap between each of the A-TRS bursts.

In one configuration, the trigger activates a timer, and the means for transmitting is further configured to transmit, in the second cell, a subsequent trigger for a subsequent A-TRS in the second cell before expiration of the timer, wherein the timer is reset in response to the subsequent trigger.

In one configuration, the trigger activates a timer, and the means for transmitting is further configured to transmit, in the first cell, a subsequent trigger for a subsequent A-TRS in the second cell after expiration of the timer, wherein the timer is reset in response to the subsequent trigger.

In one configuration, the trigger is downlink control information (DCI).

In one configuration, the trigger includes: a serving cell index for the second cell; and a trigger state for the A-TRS.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Thus, aspects of the present disclosure allow a UE to request (e.g., via UE assistance information) a base station to provide an A-TRS configuration indicating various parameters for the A-TRS which the base station is to transmit in the SSB-less secondary cell, and allow a base station to control transmission of the A-TRS in the SSB-less secondary cell based on a timer derived from the request. Moreover, aspects of the present disclosure allow a base station to trigger A-TRS transmissions in the SSB-less secondary cell via cross-carrier scheduling (e.g., using a DCI in the anchor cell which triggers A-TRS in the SSB-less secondary cell) before initiation of the timer or after expiration of the timer derived from the request. Additionally, aspects of the present disclosure allow a base station to trigger A-TRS transmissions in the SSB-less secondary cell via self-scheduling (e.g., using a DCI in the SSB-less secondary cell which triggers A-TRS and schedules PDSCH in the SSB-less secondary cell) before expiration of the timer derived from the request. As a result, network energy savings provided by SSB-less secondary cells may be accommodated in inter-band CA.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Clause 1. An apparatus for wireless communication, comprising: a processor; memory coupled with the processor; and instructions stored in the memory and operable, when executed by the processor, to cause the apparatus to: transmit, in a first cell, a request for an aperiodic tracking reference signal (A-TRS); and receive, in a second cell lacking synchronization signal block (SSB) transmissions, the A-TRS based on the request.

Clause 2. The apparatus of clause 1, wherein the first cell is an anchor cell served by a first component carrier in a first frequency band, and the second cell is a secondary cell served by a second component carrier in a second frequency band, the second frequency band being different than the first frequency band.

Clause 3. The apparatus of clause 1 or clause 2, wherein the request includes UE assistance information indicating at least one of: the second cell in which the A-TRS is to be received, a bandwidth associated with the A-TRS, a quantity of A-TRS bursts in a transmission occasion including the A-TRS, a quantity of slots for each of the A-TRS bursts, or a time gap between each of the A-TRS bursts.

Clause 4. The apparatus of any of clauses 1 to 3, wherein the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell.

Clause 5. The apparatus of clause 4, wherein the instructions, when executed by the processor, further cause the apparatus to: receive, in the first cell, a trigger of the A-TRS in the second cell following an A-TRS configuration responsive to the request, wherein the trigger activates a timer based on the timeline information.

Clause 6. The apparatus of any of clauses 1 to 5, wherein the instructions, when executed by the processor, further cause the apparatus to: receive, in the first cell, a configuration of the A-TRS in response to the request; and receive, in the first cell, a trigger of the A-TRS in the second cell following the configuration.

Clause 7. The apparatus of clause 6, wherein the configuration includes at least one of: a resource set configuration for the A-TRS, or an aperiodic, channel state information reference signal (A-CSI-RS) trigger state for the A-TRS.

Clause 8. The apparatus of clause 7, wherein the resource set configuration includes at least one of: a non-zero power, channel state information reference signal (NZP-CSI-RS) resource set for an A-TRS burst, a quantity of A-TRS bursts in a transmission occasion including the A-TRS, or a time gap between each of the A-TRS bursts.

Clause 9. The apparatus of any of clauses 6 to 8, wherein the trigger activates a timer, and the instructions, when executed by the processor, further cause the apparatus to: receive, in the second cell, a subsequent trigger for a subsequent A-TRS in the second cell before expiration of the timer, wherein the timer is reset in response to the subsequent trigger.

Clause 10. The apparatus of any of clauses 6 to 9, wherein the trigger activates a timer, and the instructions, when executed by the processor, further cause the apparatus to: receive, in the first cell, a subsequent trigger for a subsequent A-TRS in the second cell after expiration of the timer, wherein the timer is reset in response to the subsequent trigger.

Clause 11. The apparatus of any of clauses 6 to 10, wherein the trigger is downlink control information (DCI).

Clause 12. The apparatus of any of clauses 6 to 11, wherein the trigger includes: a serving cell index for the second cell; and a trigger state for the A-TRS.

Clause 13. An apparatus for wireless communication, comprising: a processor; memory coupled with the processor; and instructions stored in the memory and operable, when executed by the processor, to cause the apparatus to: receive, in a first cell, a request for an aperiodic tracking reference signal (A-TRS); and transmit, in a second cell lacking synchronization signal block (SSB) transmissions, the A-TRS based on the request.

Clause 14. The apparatus of clause 13, wherein the first cell is an anchor cell served by a first component carrier in a first frequency band, and the second cell is a secondary cell served by a second component carrier in a second frequency band, the second frequency band being different than the first frequency band.

Clause 15. The apparatus of clause 13 or clause 14, wherein the request includes UE assistance information indicating at least one of: the second cell in which the A-TRS is to be transmitted, a bandwidth associated with the A-TRS, a quantity of A-TRS bursts in a transmission occasion including the A-TRS, a quantity of slots for each of the A-TRS bursts, or a time gap between each of the A-TRS bursts.

Clause 16. The apparatus of any of clauses 13 to 15, wherein the request includes timeline information indicating at least one of: a minimum time period between a first transmission occasion including the A-TRS and a second transmission occasion including a subsequent A-TRS in the second cell, or a maximum time period between a last A-TRS burst and a downlink data transmission in the second cell.

Clause 17. The apparatus of clause 16, wherein the instructions, when executed by the processor, further cause the apparatus to: transmit, in the first cell, a trigger of the A-TRS in the second cell following an A-TRS configuration responsive to the request, wherein the trigger activates a timer based on the timeline information.

Clause 18. The apparatus of any of clauses 13 to 17, wherein the instructions, when executed by the processor, further cause the apparatus to: transmit, in the first cell, a configuration of the A-TRS in response to the request; and transmit, in the first cell, a trigger of the A-TRS in the second cell following the configuration.

Clause 19. The apparatus of clause 18, wherein the configuration includes at least one of: a resource set configuration for the A-TRS, or an aperiodic, channel state information reference signal (A-CSI-RS) trigger state for the A-TRS.

Clause 20. The apparatus of clause 19, wherein the resource set configuration includes at least one of: a non-zero power, channel state information reference signal (NZP-CSI-RS) resource set for an A-TRS burst, a quantity of A-TRS bursts in a transmission occasion including the A-TRS, or a time gap between each of the A-TRS bursts.

Clause 21. The apparatus of any of clauses 18 to 20, wherein the trigger activates a timer, and the instructions, when executed by the processor, further cause the apparatus to: transmit, in the second cell, a subsequent trigger for a subsequent A-TRS in the second cell before expiration of the timer, wherein the timer is reset in response to the subsequent trigger.

Clause 22. The apparatus of any of clauses 18 to 21, wherein the trigger activates a timer, and the instructions, when executed by the processor, further cause the apparatus to: transmit, in the first cell, a subsequent trigger for a subsequent A-TRS in the second cell after expiration of the timer, wherein the timer is reset in response to the subsequent trigger.

Clause 23. The apparatus of any of clauses 18 to 22, wherein the trigger is downlink control information (DCI).

Clause 24. The apparatus of any of clauses 18 to 23, wherein the trigger includes: a serving cell index for the second cell; and a trigger state for the A-TRS.

Clause 25. A method of wireless communication at a user equipment (UE), comprising: transmitting, in a first cell, a request for an aperiodic tracking reference signal (A-TRS); and receiving, in a second cell lacking synchronization signal block (SSB) transmissions, the A-TRS based on the request.

Clause 26. The method of clause 25, wherein the first cell is an anchor cell served by a first component carrier in a first frequency band, and the second cell is a secondary cell served by a second component carrier in a second frequency band, the second frequency band being different than the first frequency band.

Clause 27. The method of clause 25 or clause 26, further comprising: receiving, in the first cell, a configuration of the A-TRS in response to the request; and receiving, in the first cell, a trigger of the A-TRS in the second cell following the configuration.

Clause 28. The method of clause 27, wherein the trigger activates a timer, and the method further comprises: receiving, in the second cell, a subsequent trigger for a subsequent A-TRS in the second cell before expiration of the timer, wherein the timer is reset in response to the subsequent trigger.

Clause 29. The method of clause 27 or clause 28, wherein the trigger activates a timer, and the method further comprises: receiving, in the first cell, a subsequent trigger for a subsequent A-TRS in the second cell after expiration of the timer, wherein the timer is reset in response to the subsequent trigger.

Clause 30. A method of wireless communication at a network entity, comprising: receiving, in a first cell, a request for an aperiodic tracking reference signal (A-TRS); and transmitting, in a second cell lacking synchronization signal block (SSB) transmissions, the A-TRS based on the request.

What is claimed is:

1. An apparatus for wireless communication, comprising:
at least one processor;
at least one memory coupled with the at least one processor; and
instructions stored in the at least one memory and operable, when executed by the at least one processor, to cause the apparatus to:
transmit, via user equipment (UE) assistance information in a first cell, a request for an aperiodic tracking reference signal (A-TRS); and
receive, in a second cell lacking synchronization signal block (SSB) transmissions, the A-TRS based on the request, wherein the first cell is an anchor cell served by a first component carrier in a first frequency band, and the second cell is a secondary cell served by a second component carrier in a second frequency band, the second frequency band being different than the first frequency band.

2. The apparatus of claim 1, wherein the UE assistance information indicates at least one of:
the second cell in which the A-TRS is to be received,
a bandwidth associated with the A-TRS,
a quantity of A-TRS bursts in a transmission occasion including the A-TRS,
a quantity of slots for each of the A-TRS bursts, or
a time gap between each of the A-TRS bursts.

3. The apparatus of claim 1, wherein the request includes timeline information indicating at least one of:
a minimum time period between a first transmission occasion including the A-TRS and a second transmission occasion including a subsequent A-TRS in the second cell, or
a maximum time period between a last A-TRS burst and a downlink data transmission in the second cell.

4. The apparatus of claim 3, wherein the instructions, when executed by the at least one processor, further cause the apparatus to:
receive, in the first cell, a trigger of the A-TRS in the second cell following an A-TRS configuration responsive to the request, wherein the trigger activates a timer based on the timeline information.

5. The apparatus of claim 1, wherein the instructions, when executed by the at least one processor, further cause the apparatus to:
receive, in the first cell, a configuration of the A-TRS in response to the request; and
receive, in the first cell, a trigger of the A-TRS in the second cell following the configuration.

6. The apparatus of claim 5, wherein the configuration includes at least one of:
a resource set configuration for the A-TRS, or
an aperiodic, channel state information reference signal (A-CSI-RS) trigger state for the A-TRS.

7. The apparatus of claim 6, wherein the resource set configuration includes at least one of:
a non-zero power, channel state information reference signal (NZP-CSI-RS) resource set for an A-TRS burst,
a quantity of A-TRS bursts in a transmission occasion including the A-TRS, or
a time gap between each of the A-TRS bursts.

8. The apparatus of claim 5, wherein the trigger activates a timer, and the instructions, when executed by the at least one processor, further cause the apparatus to:
receive, in the second cell, a subsequent trigger for a subsequent A-TRS in the second cell before expiration of the timer, wherein the timer is reset in response to the subsequent trigger.

9. The apparatus of claim 5, wherein the trigger activates a timer, and the instructions, when executed by the at least one processor, further cause the apparatus to:
receive, in the first cell, a subsequent trigger for a subsequent A-TRS in the second cell after expiration of the timer, wherein the timer is reset in response to the subsequent trigger.

10. The apparatus of claim 5, wherein the trigger is downlink control information (DCI).

11. The apparatus of claim 5, wherein the trigger includes:
a serving cell index for the second cell; and
a trigger state for the A-TRS.

12. An apparatus for wireless communication, comprising:

at least one processor;

at least one memory coupled with the at least one processor; and instructions stored in the at least one memory and operable, when executed by the at least one processor, to cause the apparatus to:

receive, via user equipment (UE) assistance information in a first cell, a request for an aperiodic tracking reference signal (A-TRS); and transmit, in a second cell lacking synchronization signal block (SSB) transmissions, the A-TRS based on the request, wherein the first cell is an anchor cell served by a first component carrier in a first frequency band, and the second cell is a secondary cell served by a second component carrier in a second frequency band, the second frequency band being different than the first frequency band.

13. The apparatus of claim 12, wherein the UE assistance information indicates at least one of:

the second cell in which the A-TRS is to be transmitted, a bandwidth associated with the A-TRS, a quantity of A-TRS bursts in a transmission occasion including the A-TRS, a quantity of slots for each of the A-TRS bursts, or a time gap between each of the A-TRS bursts.

14. The apparatus of claim 12, wherein the request includes timeline information indicating at least one of:

a minimum time period between a first transmission occasion including the A-TRS and a second transmission occasion including a subsequent A-TRS in the second cell, or a maximum time period between a last A-TRS burst and a downlink data transmission in the second cell.

15. The apparatus of claim 14, wherein the instructions, when executed by the at least one processor, further cause the apparatus to:

transmit, in the first cell, a trigger of the A-TRS in the second cell following an A-TRS configuration responsive to the request, wherein the trigger activates a timer based on the timeline information.

16. The apparatus of claim 12, wherein the instructions, when executed by the at least one processor, further cause the apparatus to:

transmit, in the first cell, a configuration of the A-TRS in response to the request; and transmit, in the first cell, a trigger of the A-TRS in the second cell following the configuration.

17. The apparatus of claim 16, wherein the configuration includes at least one of:

a resource set configuration for the A-TRS, or an aperiodic, channel state information reference signal (A-CSI-RS) trigger state for the A-TRS.

18. The apparatus of claim 17, wherein the resource set configuration includes at least one of:

a non-zero power, channel state information reference signal (NZP-CSI-RS) resource set for an A-TRS burst, a quantity of A-TRS bursts in a transmission occasion including the A-TRS, or a time gap between each of the A-TRS bursts.

19. The apparatus of claim 16, wherein the trigger activates a timer, and the instructions, when executed by the at least one processor, further cause the apparatus to:

transmit, in the second cell, a subsequent trigger for a subsequent A-TRS in the second cell before expiration of the timer, wherein the timer is reset in response to the subsequent trigger.

20. The apparatus of claim 16, wherein the trigger activates a timer, and the instructions, when executed by the at least one processor, further cause the apparatus to:

transmit, in the first cell, a subsequent trigger for a subsequent A-TRS in the second cell after expiration of the timer, wherein the timer is reset in response to the subsequent trigger.

21. The apparatus of claim 16, wherein the trigger is downlink control information (DCI).

22. The apparatus of claim 16, wherein the trigger includes:

a serving cell index for the second cell; and a trigger state for the A-TRS.

23. A method of wireless communication at a user equipment (UE), comprising:

transmitting, via UE assistance information in a first cell, a request for an aperiodic tracking reference signal (A-TRS); and receiving, in a second cell lacking synchronization signal block (SSB) transmissions, the A-TRS based on the request, wherein the first cell is an anchor cell served by a first component carrier in a first frequency band, and the second cell is a secondary cell served by a second component carrier in a second frequency band, the second frequency band being different than the first frequency band.

24. The method of claim 23, further comprising:

receiving, in the first cell, a configuration of the A-TRS in response to the request; and receiving, in the first cell, a trigger of the A-TRS in the second cell following the configuration.

25. The method of claim 24, wherein the trigger activates a timer, and the method further comprises:

receiving, in the second cell, a subsequent trigger for a subsequent A-TRS in the second cell before expiration of the timer, wherein the timer is reset in response to the subsequent trigger.

26. The method of claim 24, wherein the trigger activates a timer, and the method further comprises:

receiving, in the first cell, a subsequent trigger for a subsequent A-TRS in the second cell after expiration of the timer, wherein the timer is reset in response to the subsequent trigger.

27. A method of wireless communication at a network entity, comprising:

receiving, via user equipment (UE) assistance information in a first cell, a request for an aperiodic tracking reference signal (A-TRS); and transmitting, in a second cell lacking synchronization signal block (SSB) transmissions, the A-TRS based on the request, wherein the first cell is an anchor cell served by a first component carrier in a first frequency band, and the second cell is a secondary cell served by a second component carrier in a second frequency band, the second frequency band being different than the first frequency band.

* * * * *